US011772773B2

(12) United States Patent
Tao

(10) Patent No.: US 11,772,773 B2
(45) Date of Patent: Oct. 3, 2023

(54) AIRCRAFT AND RELATED METHODS

(71) Applicant: Aurora Flight Sciences Corporation, a subsidiary of the Boeing Company, Manassas, VA (US)

(72) Inventor: Tony Shuo Tao, Somerville, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 60 days.

(21) Appl. No.: 17/511,296

(22) Filed: Oct. 26, 2021

(65) Prior Publication Data

US 2022/0212775 A1    Jul. 7, 2022

Related U.S. Application Data

(60) Provisional application No. 63/133,651, filed on Jan. 4, 2021.

(51) Int. Cl.
| | | |
|---|---|---|
| B64C 29/00 | (2006.01) | |
| B64C 1/22 | (2006.01) | |
| B64C 39/02 | (2023.01) | |
| B64D 1/10 | (2006.01) | |
| B64C 39/08 | (2006.01) | |
| B64U 101/60 | (2023.01) | |

(52) U.S. Cl.
CPC ............ *B64C 1/22* (2013.01); *B64C 29/0033* (2013.01); *B64C 39/024* (2013.01); *B64C 39/08* (2013.01); *B64D 1/10* (2013.01); *B64U 2101/60* (2023.01)

(58) Field of Classification Search
CPC ..... B64C 1/22; B64C 1/1415; B64C 29/0033; B64C 39/08; B64D 1/10
See application file for complete search history.

(56) References Cited

U.S. PATENT DOCUMENTS

| | | |
|---|---|---|
| 1,987,788 A | 1/1935 | Morton |
| D210,809 S | 4/1968 | Stearman |
| D277,976 S | 3/1985 | Holloway et al. |
| 4,739,957 A | 4/1988 | Vess et al. |
| D616,804 S | 6/2010 | Manley et al. |
| D628,528 S | 12/2010 | Cabezas Carrasco |
| D630,996 S | 1/2011 | Gall et al. |
| D642,968 S | 8/2011 | Zhao |
| D651,156 S | 12/2011 | Gundlach |
| D691,547 S | 10/2013 | Hall et al. |
| 8,622,334 B2 | 1/2014 | Drela et al. |

(Continued)

FOREIGN PATENT DOCUMENTS

| | | |
|---|---|---|
| EP | 3466812 | 4/2019 |
| GB | 935715 | 9/1963 |

(Continued)

*Primary Examiner* — Tye William Abell
(74) *Attorney, Agent, or Firm* — Kolitch Romano Dascenzo Gates LLC

(57) ABSTRACT

Aircraft and related methods are disclosed. In one example, an aircraft comprises an airframe comprising one or more wings, one or more pusher rotors supported by the airframe, and one or more puller rotors supported by the airframe, wherein the one or more puller rotors are positioned behind the one or more pusher rotors. In another example, a method for loading cargo on to an aircraft comprises loading cargo into a fuselage of the aircraft through an upper forward portion of the fuselage.

20 Claims, 7 Drawing Sheets

(56) References Cited

U.S. PATENT DOCUMENTS

| | | | |
|---|---|---|---|
| 8,721,383 | B2 | 5/2014 | Woodworth et al. |
| 8,800,912 | B2 | 8/2014 | Oliver |
| D712,310 | S | 9/2014 | Gundlach et al. |
| D725,576 | S | 3/2015 | Vickers |
| 9,010,683 | B2 | 4/2015 | Gundlach et al. |
| D733,029 | S | 6/2015 | Dutertre |
| 9,085,355 | B2 | 7/2015 | DeLorean |
| D736,140 | S | 8/2015 | Moller |
| D739,807 | S | 9/2015 | Strand et al. |
| 9,346,542 | B2 | 5/2016 | Leng |
| D763,733 | S | 8/2016 | Gattelli et al. |
| 9,475,579 | B2 | 10/2016 | Fredericks et al. |
| 9,499,266 | B1 * | 11/2016 | Garreau ............... B64C 9/00 |
| 9,505,484 | B1 | 11/2016 | Al-Sabah |
| 9,709,993 | B2 | 1/2017 | Tanahashi |
| 9,562,773 | B2 | 2/2017 | Paduano et al. |
| D795,160 | S | 8/2017 | Koppenwallner |
| D799,402 | S | 10/2017 | Cummings |
| D807,273 | S | 1/2018 | Koppenwallner |
| D808,328 | S | 1/2018 | Ivans et al. |
| D809,448 | S | 2/2018 | Schmiderer et al. |
| D810,621 | S | 2/2018 | Sadek |
| D813,143 | S | 3/2018 | Belik et al. |
| D822,579 | S | 7/2018 | Lienhard et al. |
| D824,321 | S | 7/2018 | Ivans et al. |
| D824,804 | S | 8/2018 | Tian |
| D829,633 | S | 10/2018 | Cummings |
| D832,141 | S | 10/2018 | Ferner |
| D833,364 | S | 11/2018 | Schmiderer et al. |
| D844,537 | S | 4/2019 | MacAndrew et al. |
| D845,169 | S | 4/2019 | Cui et al. |
| 10,252,815 | B2 | 4/2019 | Murugappan et al. |
| 10,279,901 | B2 | 5/2019 | Ivans et al. |
| D850,357 | S | 6/2019 | Cummings |
| D872,681 | S | 1/2020 | Tzarnotzky et al. |
| D873,200 | S | 1/2020 | Langford, III et al. |
| 10,543,905 | B1 | 1/2020 | Kwon et al. |
| D875,022 | S | 2/2020 | Cummings |
| 10,625,852 | B2 | 4/2020 | Bevirt et al. |
| 2005/0230519 | A1 * | 10/2005 | Hurley ............... B64C 29/0033 244/7 C |
| 2015/0344134 | A1 | 12/2015 | Cruz Ayoroa |
| 2016/0214710 | A1 | 7/2016 | Brody et al. |
| 2018/0162525 | A1 | 6/2018 | St. Clair et al. |
| 2018/0215465 | A1 | 8/2018 | Renteria |
| 2019/0127056 | A1 | 5/2019 | Weekes et al. |
| 2019/0135424 | A1 | 5/2019 | Baity et al. |
| 2019/0256194 | A1 | 8/2019 | Vander Lind et al. |
| 2019/0291863 | A1 | 9/2019 | Lyasoff et al. |
| 2020/0164972 | A1 | 5/2020 | Kiesewetter et al. |
| 2020/0269975 | A1 | 8/2020 | Fink et al. |
| 2021/0031910 | A1 | 2/2021 | Cornes |
| 2021/0206483 | A1 | 7/2021 | Lee et al. |
| 2022/0009626 | A1 | 1/2022 | Baharav et al. |
| 2022/0135217 | A1 * | 5/2022 | Wittmaak, Jr. ........ B64D 9/003 244/7 B |

FOREIGN PATENT DOCUMENTS

| | | |
|---|---|---|
| WO | WO 2015/143093 | 9/2015 |
| WO | WO 2016/018486 | 2/2016 |
| WO | WO 2019/202325 | 10/2019 |
| WO | WO 2019/211875 | 11/2019 |
| WO | WO-2019211875 A1 * | 11/2019 |

* cited by examiner

ND METHODS

RELATED APPLICATION

The present application is a non-provisional of and claims priority to U.S. Provisional Patent Application No. 63/133,651, filed on Jan. 4, 2021, entitled "AIRCRAFT AND RELATED METHODS," the complete disclosure of which is incorporated by reference.

FIELD

The present disclosure relates to aircraft.

BACKGROUND

Rotorcraft (aircraft comprising rotors) utilize spinning rotors to produce thrust. Some rotorcraft tilt their rotors to change thrust direction. For example, vertical take-off and landing (VTOL) rotorcraft may tilt their rotors between horizontal and vertical positions to transition between vertical and horizontal flights, respectively. However, conventional rotors often extend beyond the footprint of the rotorcraft's airframe (e.g., in front of the wings). As a result, persons on the ground may be more likely to come into contact with these rotors, especially when the rotors are close to the ground (within a few meters off the ground), such as on a small rotorcraft. Thus, rotor configurations that are more contained within the airframe's footprint are desired.

Further, conventional push-pull rotorcraft (aircraft that utilize a forward-mounted puller rotor and a rearward-mounted pusher rotor) often position the rearward-mounted pusher rotor behind the forward-mounted puller rotor. Because of its alignment with the forward-mounted puller rotor, the rearward-mounted pusher rotor operates in the disturbed airflow of the forward-mounted puller rotor, which may reduce the efficiency and thrust output of the rearward-mounted pusher rotor. Thus, rotor configurations that boost the efficiency and thrust output of the rearward-mounted rotor(s) of push-pull aircraft are desired.

Further, some cargo aircraft may be difficult to load and/or unload at least because of their size and/or location of their doors. For example, small, unmanned delivery rotorcraft may be difficult to load and/or unload because they may include doors on the sides of the aircraft that are difficult to access when the aircraft is on the ground. Thus, aircraft that are easier and/or faster to load and/or unload are desired. Further, the location of the cargo on such delivery aircraft may vary depending on where the cargo was deposited initially and/or whether the cargo shifted during flight. Changes in cargo location may affect the aircraft's center of gravity, aerodynamic center, and/or flight characteristics, making it more difficult to maintain stable flight. Thus, aircraft and/or loading/unloading methods are desired that minimize cargo drift in the aircraft. Further, the power sources on some conventional unmanned rotorcraft may be difficult to access and/or replace. Thus, aircraft having more accessible, conveniently located power sources are desired.

SUMMARY

Aircraft and related methods are disclosed. In one example, an aircraft comprises an airframe comprising one or more wings, one or more pusher rotors supported by the airframe, and one or more puller rotors supported by the airframe, wherein the one or more puller rotors are positioned behind the one or more pusher rotors. In some such examples, one or more pusher rotors extend behind a forward set of wings, and one or more puller rotors extend in front of an aft set of wings. Aircraft optionally include a fuselage comprising a cargo hold configured to store cargo, a cargo door configured to selectively open to receive the cargo through an upper forward portion of the fuselage, and a ramp structure included within the fuselage. When included, the ramp structure is configured to provide a passageway for the cargo to advance between the cargo door and the cargo hold. In some examples, aircraft additionally include a cargo unloading door positioned below the cargo door that is configured to selectively open to unload cargo from a bottom of the fuselage.

In another example, a method for loading cargo on to an aircraft comprises loading cargo into a fuselage of the aircraft through an upper forward portion of the fuselage. The method optionally comprises advancing the cargo downwards and rearwards towards and/or into a cargo hold of the aircraft. Additionally or alternatively, the method optionally comprises unloading the cargo through a bottom of the fuselage.

DESCRIPTION

Aircraft and related methods are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure. Further, select elements are shown in a different position and/or orientation using dash-dot lines.

FIGS. 1-7 illustrate aircraft (e.g., rotorcraft) and related structures and methods for loading and/or unloading the aircraft. In particular, FIGS. 1-5 illustrate example rotorcraft that include one or more forward rotors and one or more rearward rotors arranged in a push-pull configuration. However, unlike conventional push-pull aircraft where the forward-mounted rotor is a puller rotor and the rearward-mounted rotor is a pusher rotor, the one or more forward-mounted rotors of the rotorcraft of the present disclosure are pusher rotors and the one or more rearward-mounted rotors are puller rotors. Thus, the orientation of the pusher and puller rotors of the present disclosure is reversed as compared to conventional push-pull rotorcraft. In this reversed orientation, the rotors may be set in farther from front and rear ends of the aircraft, closer to a middle of the aircraft.

As one example where the rotorcraft comprises forward and rearward sets of wings, the rotors are positioned between the sets of wings. In particular, in some such examples, the one or more pusher rotors are positioned off a trailing edge of a forward set of wings (i.e., behind the forward set of wings) and the one or more puller rotors are positioned off a leading edge of a rearward set of wings (i.e., in front of the rearward set of wings). In this way, the rotors may not stick out as far from the front and rear ends of the airframe and/or may be positioned closer to a middle of the aircraft (farther away from the front and rear ends of the airframe) than conventional rotorcraft. In this way, aircraft of the present disclosure may reduce the chance that the rotors come into contact with a person or object as compared to conventional push-pull rotorcraft.

Figure 3:
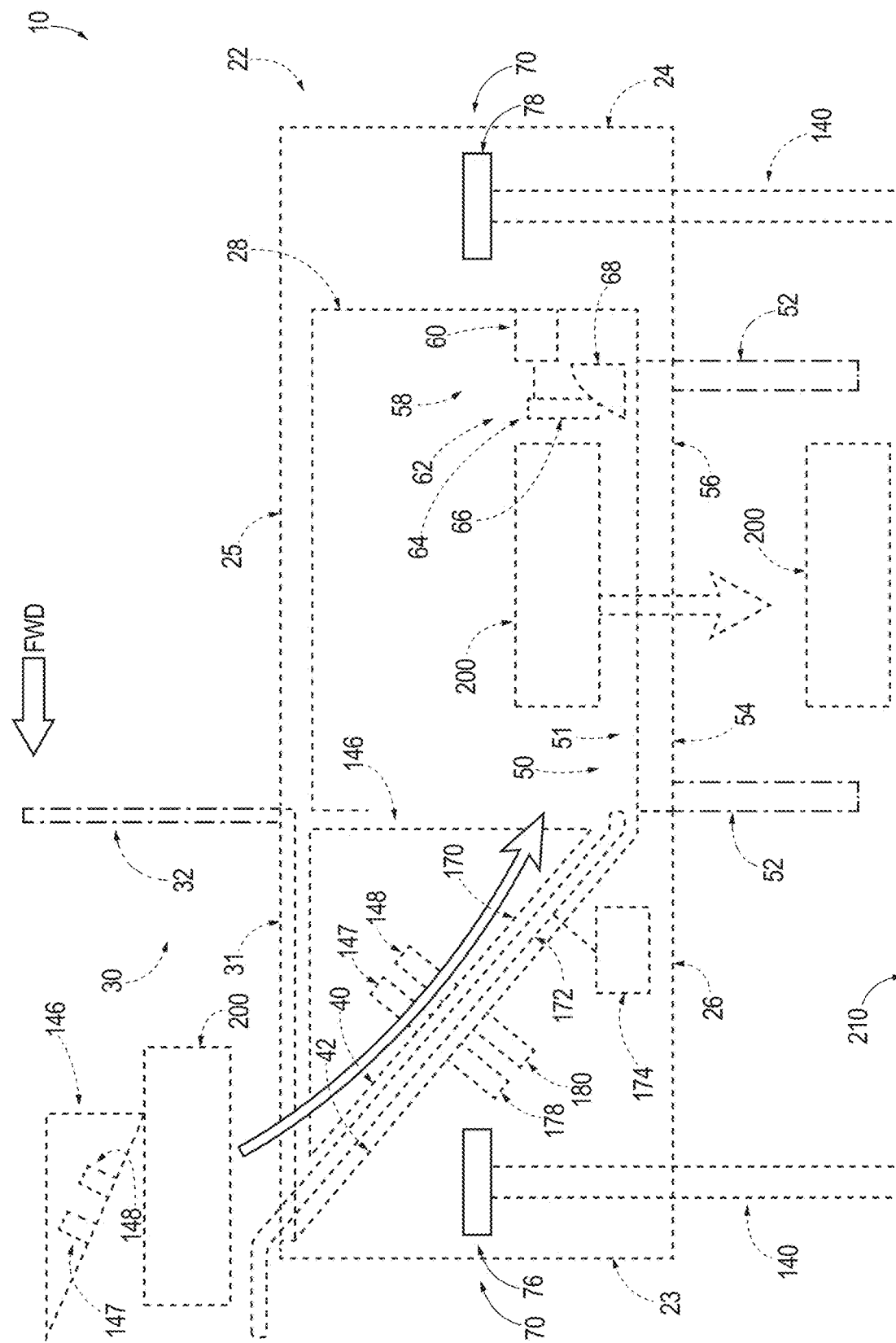
FIG. 3 is a schematic side view of the rotorcraft of FIG. 1 illustrating example loading and unloading structures for cargo.
Figure 6:
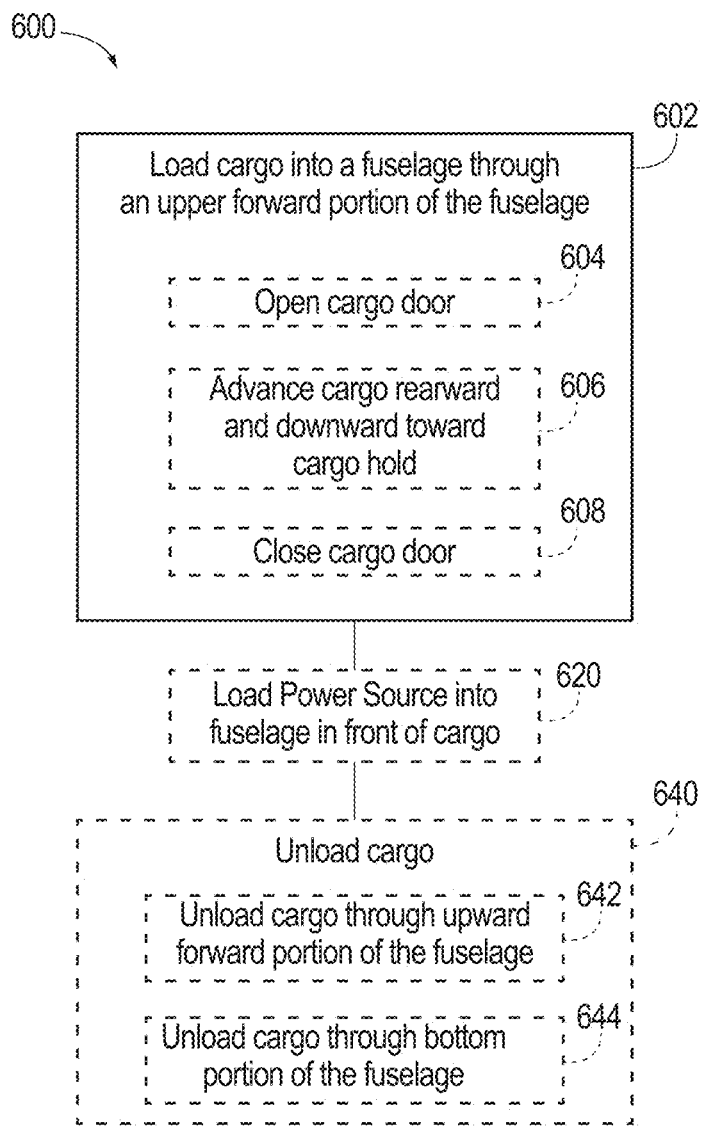
FIG. 6 is a flowchart schematically representing methods for loading and/or unloading an aircraft.
Figure 7:
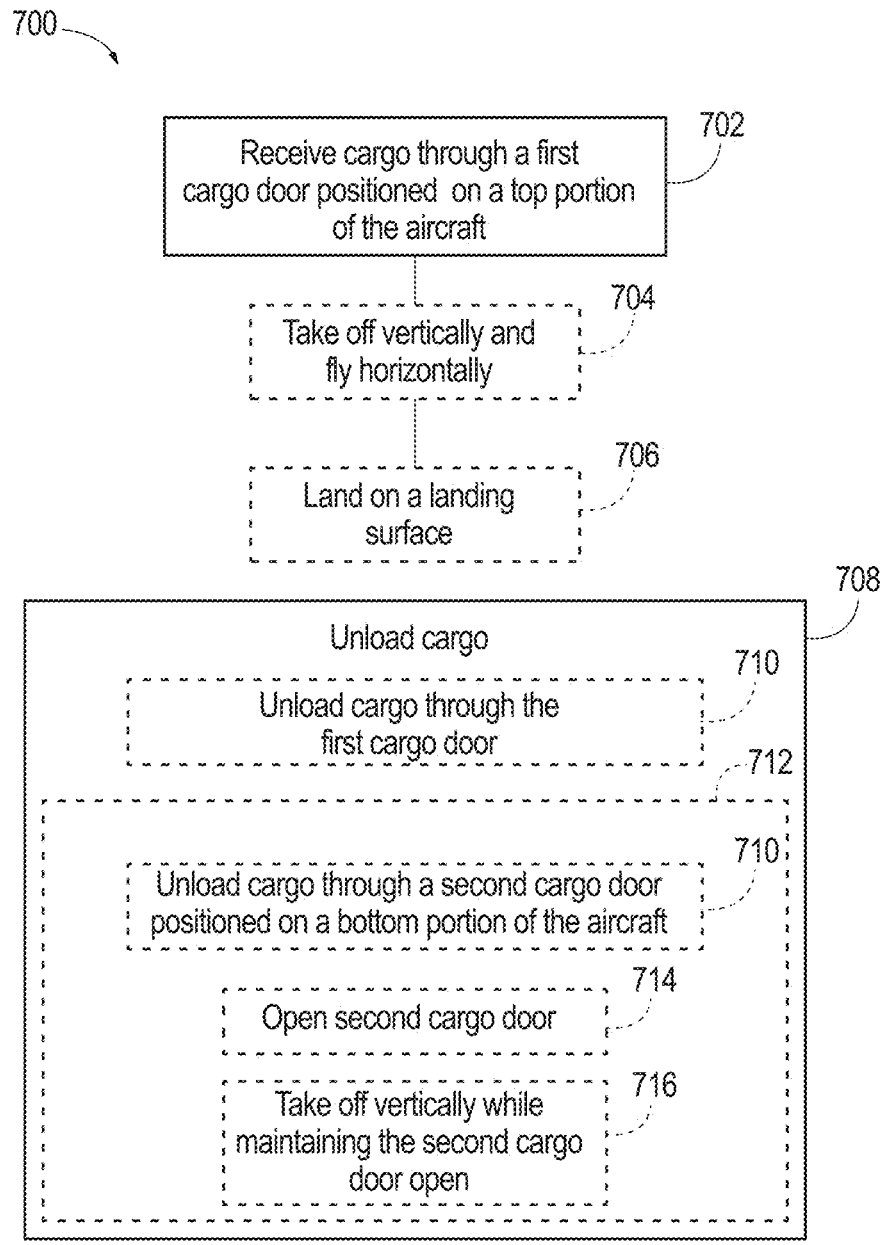
FIG. 7 is a flowchart schematically representing methods for loading and/or unloading cargo.

FIG. 3 illustrates loading and/or unloading structures that are optionally included in aircraft (e.g., rotorcraft) of the present disclosure, and FIGS. 6-7 illustrate methods for loading and/or unloading aircraft of the present disclosure. Unlike conventional aircraft that have front, side, and/or rear doors, in some examples, aircraft of the present disclosure comprise a top cargo door that is configured to selectively open to receive and/or unload cargo through an upper forward portion of the aircraft's fuselage. Including the cargo door on the top of the fuselage may facilitate and/or expedite the cargo loading and/or unloading process when the cargo is being loaded from, and/or unloaded to, a position above the aircraft. As an example, many smaller, unmanned delivery aircraft may be shorter than the persons, cargo docks, conveyer belts, etc. from which they may receive cargo and/or to which they may deliver cargo.

Aircraft of the present disclosure also optionally include a ramp structure that is configured to facilitate the movement of cargo to and/or from a cargo hold of the aircraft that is positioned behind (rearward of) the top cargo door. In some examples, the aircraft include a power source that is configured to occupy at least some of the space above the ramp structure after the cargo has been loaded into the cargo hold. The ramp structure and power source may serve as a physical barrier for the cargo, preventing the cargo from sliding forward during flight. Further, in its position above the above the ramp structure (and directly beneath the top cargo door), the power source may be more accessible to a user and easy to replace. In some examples, the aircraft also include a bottom cargo door positioned below the cargo hold that is configured to selectively open to load and/or unload cargo from a bottom portion of the fuselage. Loading and/or unloading the cargo through the bottom cargo door may automate and/or expedite the loading and/or unloading process. For example, for loading cargo, the aircraft may vertically land or hover over the cargo, with the bottom cargo door being configured to engage and lift, or scoop, the cargo into the cargo hold. For unloading cargo, the aircraft may vertically lift away from the cargo so that it falls out of the aircraft under its own weight due to gravity (without requiring user intervention) when the bottom cargo door is opened.

Figure 1:
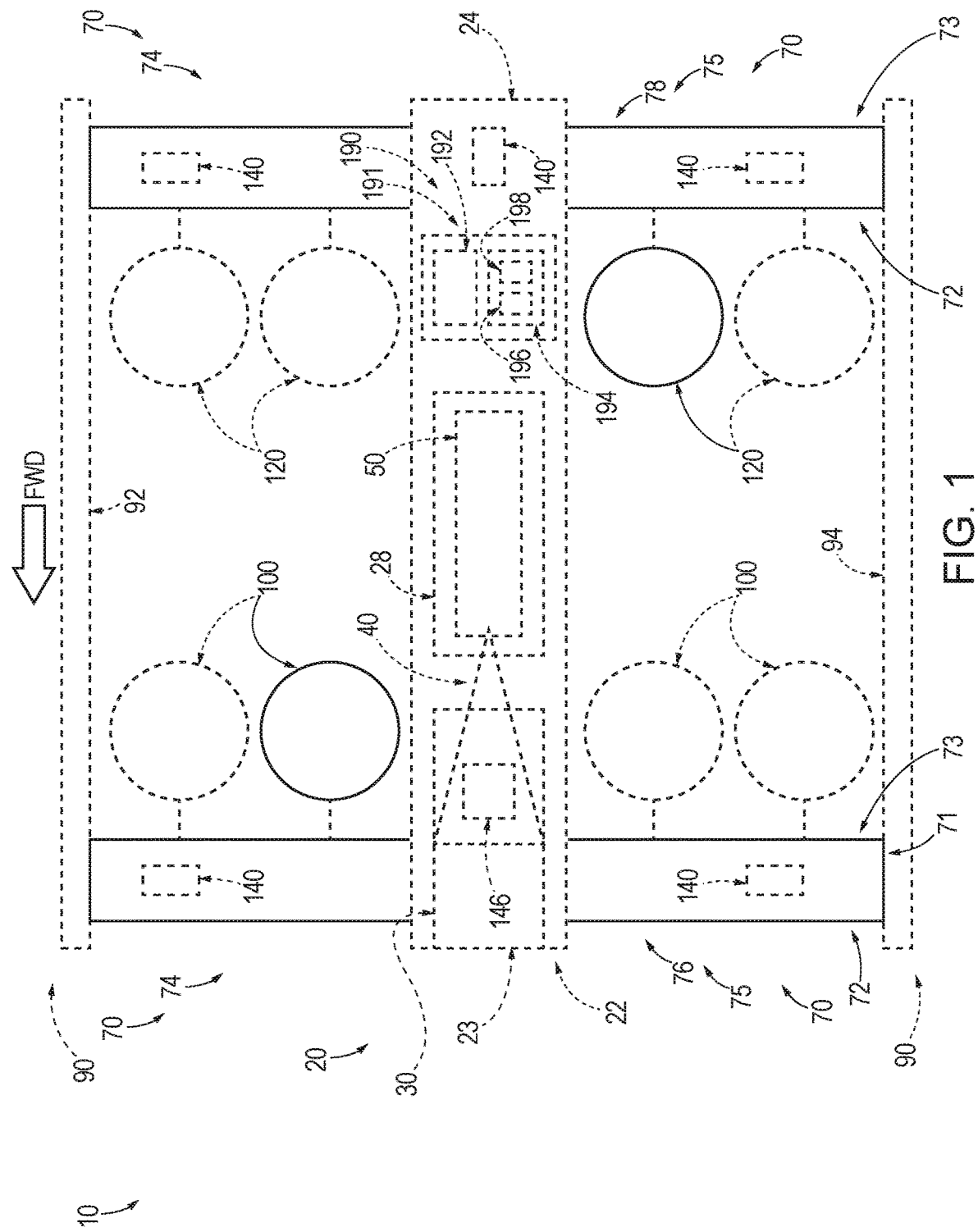
FIG. 1 is a schematic representation of a rotorcraft, according to the present disclosure.
Figure 2:
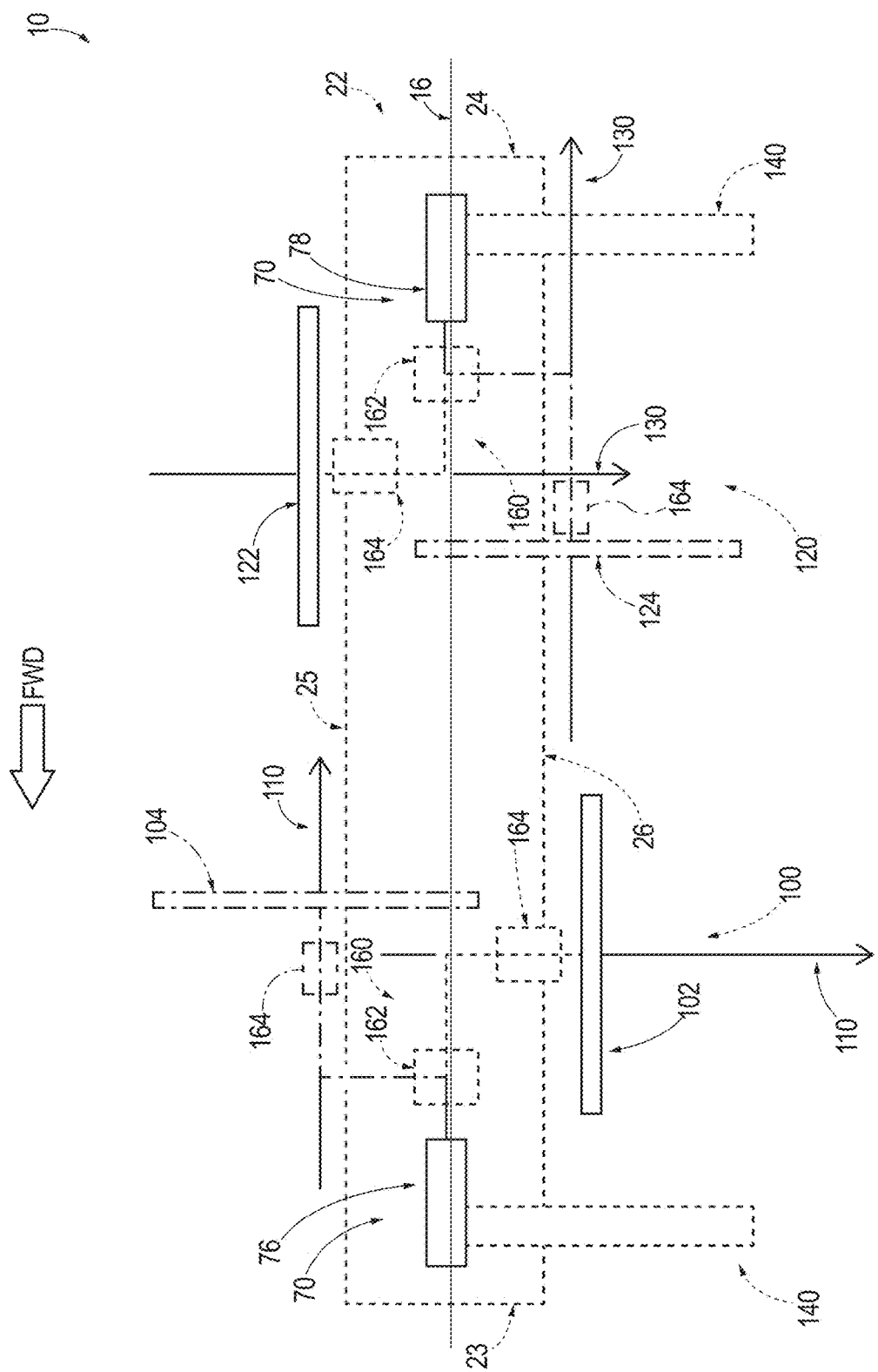
FIG. 2 is a schematic side view of the rotorcraft of FIG. 1 illustrating different example positions of the rotors.

FIGS. 1-3 schematically illustrate an aircraft 10, according the present disclosure. FIG. 1 schematically illustrates aircraft 10 at a high-level, and FIGS. 2-3 illustrate additional optional elements, features, and/or configurations of aircraft 10. In particular, FIG. 2 schematically illustrates different rotor positions of aircraft 10 in examples where aircraft 10 includes rotors that are configured to tilt, and FIG. 3 schematically illustrates various loading and/or unloading structures that are optionally included in aircraft 10, such as when it is configured as a cargo aircraft. Because FIGS. 1-3 all illustrate various features, elements, and/or configurations of aircraft 10, they will be described collectively herein. For convenience, specific reference may be made to particular figure(s), where appropriate.

In the figures, a forward ("FWD") direction of aircraft 10 is schematically represented and corresponds to the forward direction of flight of aircraft 10 when configured for horizontal flight (e.g., in a cruise mode, as discussed herein). Herein, such positional terms as "forward," "front," "rearward," "rear," "in front of," "behind," etc. are with respect to the designated forward direction of flight of aircraft 10. For example, a first structure that is described as being behind a second structure is positioned rearward of the second structure relative to the forward direction of flight of the aircraft. Similarly, a first structure that is described as being in front of a second structure is positioned forward of the second structure relative to the forward direction of flight of the aircraft.

As schematically illustrated in FIGS. 1-3, aircraft 10 includes an airframe 20, one or more pusher rotors 100 supported by airframe 20, and one or more puller rotors 120 supported by airframe 20. Because aircraft 10 includes rotors, aircraft 10 also may be referred to as a rotorcraft. In some examples, aircraft 10 is configured to take off and land vertically, and, in some such examples, aircraft 10 may be referred to as vertical take-off and landing (VTOL) aircraft. In some examples, aircraft 10 is configured to be an autonomous delivery vehicle, and, in some such examples, aircraft 10 may be referred to as unmanned aircraft. In some examples, aircraft 10 is an electric aircraft.

Airframe 20 includes one or more wings 70 and, in some examples, a fuselage 22. In some examples, one or more wings 70 include a forward set of wings 76 and/or an aft set of wings 78 (also referred to herein as "rearward set of wings 78"). When included, aft set of wings 78 is positioned behind forward set of wings 76, more proximate a rear end of aircraft 10.

One or more wings 70 comprise aerodynamic surfaces that are configured to generate lift. In some examples, and as described in greater detail below, one or more wings 70 also are configured to support one or more pusher rotors 100 and/or one or more puller rotors 120. As one such example, forward set of wings 76 is configured to support (e.g., structurally support, retain, and/or otherwise hold in place) one or more pusher rotors 100 at a trailing edge thereof, and/or rearward set of wings 78 is configured to support one or more puller rotors 120 at a leading edge thereof. As examples, the one or more pusher rotors and/or the one or more puller rotors are connected to, coupled to, mounted to, attached to, and/or otherwise supported by the wings via a mechanical linkage 160 (e.g., mounting structures, fasteners, etc.), illustrated in FIG. 2.

In some examples, one or more wings 70 include tips 71 (optionally including winglets), a leading edge 72, and a trailing edge 73. One or more wings 70 are configured to generate lift when air flows around (i.e., over and under) one or more wings 70. In flight, leading edge 72 is configured to face forward (i.e., face the direction of motion of aircraft 10 and/or face oncoming airflow), and trailing edge 73 is configured to face rearward (i.e., face away from the direction of motion of aircraft 10 and/or face away from oncoming airflow).

When fuselage 22 is included in airframe 20, one or more wings 70 are coupled to, connected to, and/or otherwise supported by fuselage 22. In such examples, one or more wings 70 extend outward from fuselage 22 and terminate at tips 71 (which also may be referred to as wing tips). Further, one or more wings 70 include one or more right-side wings 74 that extend to the right of fuselage 22 and one or more left-side wings 75 that extend to the left of fuselage (i.e., from an opposite side of fuselage 22). Thus, in examples where one or more wings 70 include forward set of wings 76 and rearward set of wings 78, one or more wings 70 include four wings. In particular, forward set of wings 76 and rearward set of wings 78 each include one of the one or more right-side wings and one of the one or more left-side wings.

Figure 4:
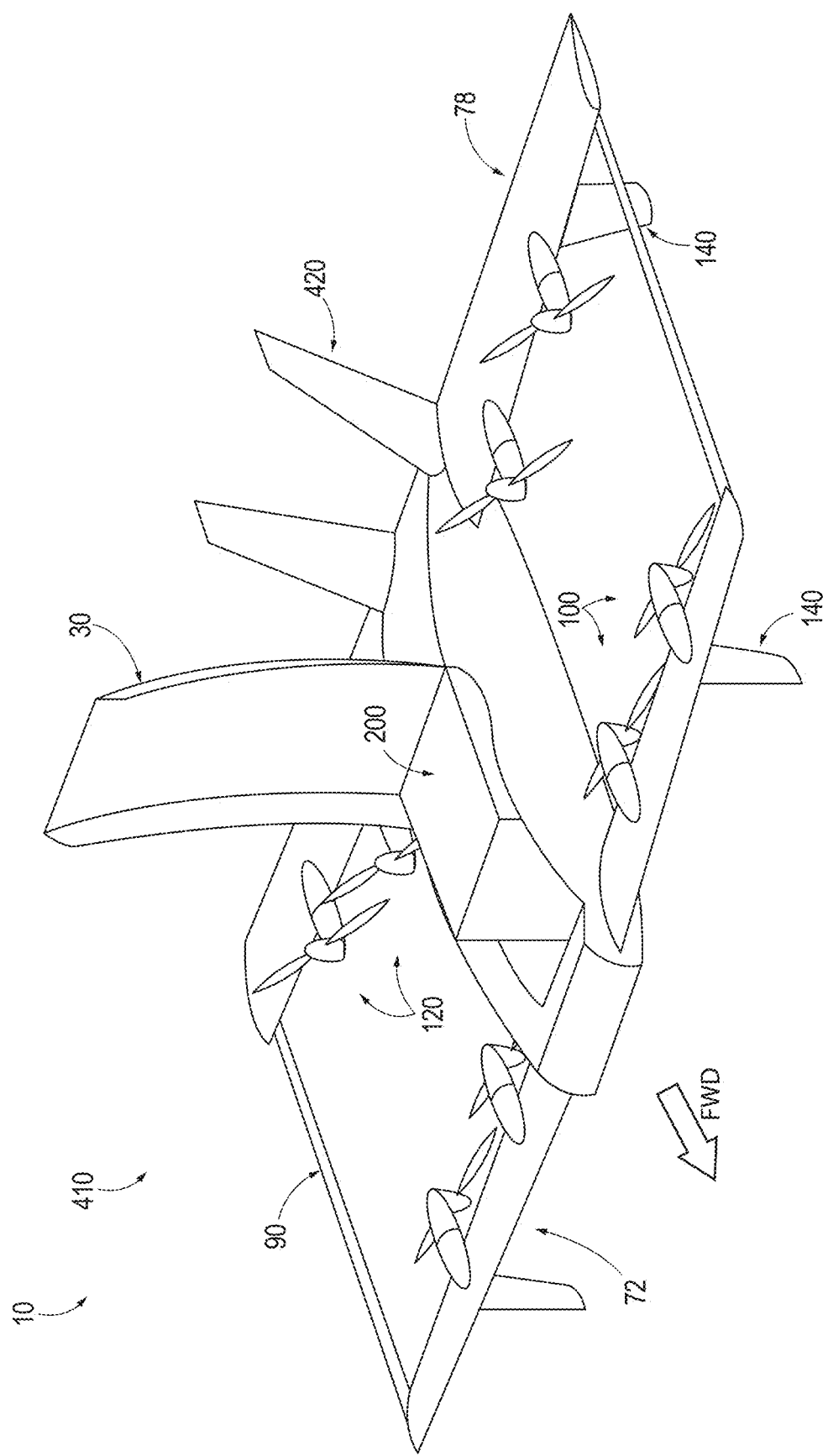
FIG. 4 is a perspective view of an example rotorcraft, according to the present disclosure.

Unlike conventional push-pull aircraft, one or more puller rotors 120 of aircraft 10 are positioned behind (rearward of) one or more pusher rotors 100. One or more pusher rotors 100 and one or more puller rotors 120 comprise rotor blades that are configured to spin and/or rotate to generate thrust. One or more pusher rotors 100 and/or one or more puller rotors 120 include at least two, at least three, at least four, at least five, and/or at least six or more rotor blades. In the example of FIG. 4, each of the rotors include two rotor blades. In some examples, one or more pusher rotors 100 are mirror images of one or more puller rotors 120 and are configured to generate thrust in an opposite direction to one or more puller rotors 120 when rotated in the same direction.

By including one or more puller rotors 120 behind one or more pusher rotors 100, the one or more puller rotors and the one or more pusher rotors may be positioned farther from the front and rear ends of airframe 20 than conventional push-pull aircraft, closer to a middle of aircraft 10. In some examples, one or more pusher rotors 100 are positioned at least partially behind forward set of wings 76 (i.e., such that the one or more pusher rotors extend behind trailing edge 73 of the forward set of wings), and one or more puller rotors 120 are positioned at least partially in front of rearward set of wings 78 (i.e., such that the one or more puller rotors extend in front of leading edge 72 of the rearward set of wings). In this way, the wings may provide a physical and visual barrier to the rotors, thereby restricting inadvertent contact with the rotors by persons.

In some examples, one or more pusher rotors 100 are positioned behind leading edge 72 of forward set of wings 76 such that one or more pusher rotors 100 do not extend forward of leading edge 72 of forward set of wings 76. In some further such examples, one or more pusher rotors 100 are fully positioned behind forward set of wings 76, such that one or more pusher rotors 100 do not overlap with forward set of wings 76 and are positioned behind trailing edge 73 of forward set of wings 76 (i.e., the one or more pusher rotors do not extend forward of the trailing edge of the forward set of wings).

In some examples, one or more puller rotors 120 are positioned forward of trailing edge 73 of rearward set of wings 78 such that one or more puller rotors 120 do not extend rearward of trailing edge 73 of rearward set of wings 78. In some further such examples, one or more puller rotors 120 are fully positioned in front of rearward set of wings 78, such that one or more puller rotors 120 do not overlap with rearward set of wings 78 and are positioned forward of leading edge 72 of rearward set of wings 78 (i.e., the one or more puller rotors do not extend rearward of the leading edge of the rearward set of wings).

In the above examples, the one or more pusher rotors and/or the one or more puller rotors are fully included and/or contained within a footprint (i.e., perimeter) of airframe 20. That is, the one or more pusher rotors and/or the one or more puller rotors do not extend past the footprint of airframe 20. In some such examples, the one or more pusher rotors and/or the one or more puller rotors are set in from (spaced away from) the perimeter of a rectangular prismatic volume that encloses the airframe 20. For example, the one or more pusher rotors and the one or more puller rotors are included and/or positioned in-between the forward set of wings and the rearward set of wings, as illustrated in the example of FIG. 1. In the above examples therefore, the wings may shield and/or protect a user from the rotors, thereby further reducing the chances that a user may come into contact with one or more of the rotors.

In some examples, aircraft 10 includes one, two, three, four, five, and/or six or more pusher rotors 100 and/or puller rotors 120. In FIG. 1, aircraft 10 is schematically represented as including at least one pusher rotor 100 and at least one puller rotor 120; however, six additional optional rotors are illustrated in dashed lines to schematically illustrate that, in some examples, more than one pusher rotor 100 and/or more than puller rotor 120 may be included. In some examples where multiple pusher rotors 100 and/or multiple puller rotors 120 are included, the rotors are positioned on opposite sides of fuselage 22. For example, when aircraft 10 includes two pusher rotors and two puller rotors, one of the pusher rotors and one of the puller rotors are positioned on the right-hand side of the aircraft (to the right of the fuselage) and the other rotors are positioned on the left-hand side of the aircraft (to the left of the fuselage). As another example, when aircraft 10 includes four pusher rotors and four puller rotors, two of the pusher rotors and two of the puller rotors are positioned on the right-hand side of the aircraft and the other rotors are positioned on the left-hand side of the aircraft.

In some examples where multiple pusher rotors 100 and/or multiple puller rotors 120 are included, the rotors are evenly spaced from one another and/or evenly spaced from fuselage 22. Additionally or alternatively, two or more (and in some such examples, all) of pusher rotors 100 are aligned with one another at the same point on longitudinal axis 16 (forward of one or more puller rotors 120) such that the two or more pusher rotors are neither forward nor rearward of one another. Additionally or alternatively, two or more (and in some such examples, all) puller rotors 120 are aligned with one another at a point on longitudinal axis 16 rearward of one or more pusher rotors 100 such that the two or more pusher rotors are neither forward nor rearward of one another.

In some examples, one or more pusher rotors 100 and/or one or more puller rotors 120 are coupled and/or otherwise connected to one or more wings 70 by mechanical linkage 160. Thus, as illustrated in FIG. 2, aircraft 10 optionally includes mechanical linkages 160. When included, mechanical linkages 160 are configured to mechanically couple and/or otherwise connect one or more pusher rotors 100 and/or one or more puller rotors 120 to one or more wings 70. In particular, mechanical linkages 160 are configured to mechanically couple and/or otherwise connect one or more pusher rotors 100 to forward set of wings 76 and/or one or more puller rotors 120 to rearward set of wings 78. As examples, mechanical linkages comprise one or more of mounting structures, fasteners, rods, gears, pulleys, chains, etc.

In some examples (as illustrated in FIG. 2), one or more pusher rotors 100 and/or one or more puller rotors 120 are configured to tilt. That is, a rotational axis 110 of one or more pusher rotors 100 and/or a rotational axis 130 of one or more puller rotors 120 is/are configured to tilt, rotate, and/or pivot relative to airframe 20, and more specifically, relative to a longitudinal axis 16 of aircraft 10. Tilting one or more pusher rotors 100 and/or one or more puller rotors 120 changes a direction of the thrust generated by the one or more pusher rotors and/or the one or more puller rotors when the one or more pusher rotors and/or the one or more puller rotors are powered on.

In particular, at constant power, tilting rotational axis 110 of one or more pusher rotors 100 toward parallel with longitudinal axis 16, increases an amount of horizontal thrust and decreases an amount of vertical thrust generated by one or more pusher rotors 100. Conversely, at constant power, tilting rotational axis 110 of one or more pusher rotors 100 away from parallel toward longitudinal axis 16, reduces the amount of horizontal thrust and increases the amount of vertical thrust generated by one or more pusher rotors 100. Similarly, at constant power, tilting rotational axis 130 of one or more puller rotors 120 toward parallel with longitudinal axis 16, increases the amount of horizontal thrust and decreases the amount of vertical thrust generated by the one or more puller rotors 120. Conversely, at constant power, tilting rotational axis 130 of one or more puller rotors 120 away from parallel to longitudinal axis 16, reduces the amount of horizontal thrust and increases the amount of vertical thrust generated by the one or more puller rotors 120.

In some examples, one or more pusher rotors 100 are configured to tilt between a vertical thrusting push position 102 (illustrated with solid lines in FIG. 2) and a horizontal thrusting push position 104 (illustrated with dash-dot lines in FIG. 2) and/or one or more puller rotors 120 are configured to tilt between a vertical thrusting pull position 122 (illustrated with solid lines in FIG. 2) and a horizontal thrusting pull position 124 (illustrated with dash-dot lines in FIG. 2). When powered on, one or more pusher rotors 100 are configured to generate at least some thrust in a positive vertical direction (opposite gravity) in vertical thrusting push position 102. In some such examples, one or more pusher rotors 100 are configured to generate thrust in a direction orthogonal to longitudinal axis 16. In such examples, rotor blades of one or more pusher rotors 100 are oriented in a horizontal position, parallel to longitudinal axis 16, in vertical thrusting push position 102. Similarly, when powered on, one or more puller rotors 120 are configured to generate at least some thrust in the positive vertical direction (opposite gravity) in the vertical thrusting pull position 122. In some such examples, one or more puller rotors 120 are configured to generate thrust in a direction orthogonal to longitudinal axis 16. In such examples, rotor blades of one or more puller rotors 120 are oriented in a horizontal position, parallel to longitudinal axis 16, in vertical thrusting pull position 122.

When powered on, one or more pusher rotors 100 are configured to generate at least some thrust in a forward horizontal direction (orthogonal to gravity) in horizontal thrusting push position 104. In some such examples, one or more pusher rotors 100 are configured to generate thrust in a direction parallel to longitudinal axis 16. In such examples, rotor blades of one or more pusher rotors 100 are oriented in a vertical position, orthogonal to longitudinal axis 16, in horizontal thrusting push position 104. Similarly, when powered on, one or more puller rotors 120 are configured to generate at least some thrust in the forward horizontal direction (orthogonal to gravity) in the horizontal thrusting pull position 124. In some such examples, one or more puller rotors 120 are configured to generate thrust in a direction parallel to longitudinal axis 16. In such examples, rotor blades of one or more puller rotors 120 are oriented in a vertical position, parallel to longitudinal axis 16, in horizontal thrusting pull position 124.

In some such examples, one or more pusher rotors 100 and/or one or more puller rotors are configured to tilt when transitioning between a hover mode and a cruise mode since the thrust direction changes when transitioning between these two modes. In particular, in the hover mode, aircraft 10 is configured to only generate thrust in a direction orthogonal to longitudinal axis 16 (e.g., the rotational axes are oriented orthogonal to longitudinal axis 16 and/or the rotor blades are oriented parallel to longitudinal axis 16), and in the cruise mode, aircraft 10 is configured to only generate thrust in a direction parallel to longitudinal axis 16 (e.g., the rotational axes are oriented parallel to longitudinal axis 16 and/or the rotor blades are oriented orthogonal to longitudinal axis 16). Thus, aircraft 10 is configured to tilt at least one of the pusher rotors and/or at least one of the puller rotors when transitioning between the hover mode and the cruise mode. In some examples, aircraft 10 also is configured to generate thrust in both the horizontal and vertical positions when transitioning between the hover mode and the cruise mode. For example, after gaining altitude in the hover mode, aircraft 10 enters a transition mode in which aircraft 10 continues to gain altitude (i.e. climb) while also beginning to move horizontally towards the cruise mode. Additionally or alternatively, aircraft 10 enters a transition mode while descending when exiting the cruise mode in which aircraft 10 continues to move horizontally but also begins to lose altitude.

In some examples, one or more pusher rotors 100 and one or more puller rotors 120 face opposite directions and/or are oriented in opposite directions. This orientation of the rotors is at least partially the result of positioning the one or more pusher rotors forward of the one or more puller rotors. For example, to generate forward thrust, one or more pusher rotors 100 face rearwards in horizontal thrusting push position 104 and/or one or more puller rotors 120 face forwards in horizontal thrusting pull position 124. Thus, in such examples, the one or more pusher rotors and the one or more puller rotors are oriented in opposite directions, facing one another. In some examples, the rotational axes of both one or more pusher rotors 100 and one or more puller rotors 120 (rotational axis 110 and rotational axis 130, respectively) are configured to rotate in the same direction to perform the same type of thrust adjustment. For example, rotational axis 110 of one or more pusher rotors 100 and rotational axis 130 of one or more puller rotors 120 are configured to rotate in the same direction (a first rotational direction) when both one or more pusher rotors 100 and one or more puller rotors 120 are tilted to increase vertical thrust and decrease horizontal thrust. Correspondingly, rotational axis 110 and rotational axis 130 are both configured to rotate in a second rotational direction that is opposite to the first rotational direction, when both of one or more pusher rotors 100 and one or more puller rotors 120 are tilted to decrease vertical thrust and increase horizontal thrust.

However, in some examples, one or more pusher rotors 100 and one or more puller rotors 120 are configured to tilt in opposite directions. In particular, one or more pusher rotors 100 are configured to tilt in an opposite direction to one or more puller rotors 120 to perform the same type of change in thrust direction (e.g., to increase horizontal thrust and decrease vertical thrust or decrease horizontal thrust and increase vertical thrust). Again, this opposite tilt configuration may be at least partially the result of the opposite orientations of the pusher and puller rotors and/or the positioning of the one or more pusher rotors forward of the one or more puller rotors. For example (as illustrated in FIG. 2), because one or more pusher rotors 100 are oriented downwards relative to their associated mechanical linkage 160 to generate positive vertical lift, the one or more pusher rotors are configured to tilt upward to increase horizontal thrust and decrease vertical thrust. Conversely, because one or more puller rotors 120 are oriented upwards relative to their associated mechanical linkage 160 to generate positive vertical lift, the one or more puller rotors are configured to tilt downward to increase horizontal thrust and decrease vertical thrust. Correspondingly, one or more pusher rotors 100 are configured to tilt downward to decrease horizontal thrust and increase vertical thrust, and one or more puller rotors 120 are configured to tilt upward to increase horizontal thrust and decrease vertical thrust.

In some examples, one or more pusher rotors 100 and one or more puller rotors 120 are vertically offset from one another. As one such example (as illustrated in FIG. 2), when one or more pusher rotors 100 are in vertical thrusting push position 102 and one or more puller rotors 120 are in vertical thrusting pull position 122, one or more pusher rotors 100 are positioned vertically below one or more puller rotors 120. However, in another example, when one or more pusher rotors 100 are in vertical thrusting push position 102 and one or more puller rotors 120 are in vertical thrusting pull position 122, one or more pusher rotors 100 are positioned vertically above one or more puller rotors 120. As another such example, when one or more pusher rotors 100 are in horizontal thrusting push position 104 and one or more puller rotors 120 are in horizontal thrusting pull position 124, rotational axis 110 of one or more pusher rotors 100 are positioned vertically below rotational axis 130 of one or more puller rotors 120. However, in another example (as illustrated in FIG. 2), when one or more pusher rotors 100 are in horizontal thrusting push position 104 and one or more puller rotors 120 are in horizontal thrusting pull position 124, rotational axis 110 of one or more pusher rotors 100 are positioned vertically above rotational axis 130 of one or more puller rotors 120.

By vertically offsetting the one or more pusher rotors and the one or more puller rotors in the horizontal thrusting positions (where the rotor blades of the one or more pusher rotors and the one or more puller rotors are vertically oriented), such as during the cruise mode, the rearward rotors (the one or more puller rotors 120) may operate less in the disturbed air of the forward rotors (the one or more pusher rotors 100), thereby increasing the efficiency and thrust output of the one or more puller rotors.

In some examples, one or more pusher rotors 100 and/or one or more puller rotors 120 are configured to tilt independently of one another. Additionally or alternatively, one or more of the one or more pusher rotors are configured to tilt independently of one another. In some such examples, each of the one or more pusher rotors is configured to be individually tilted, such that all of the one or more pusher rotors are configured to tilt independently of one another. Additionally or alternatively, one or more of the one or more puller rotors are configured to tilt independently of one another. In some such examples, each of the one or more puller rotors is configured to be individually tilted, such that all of the one or more puller rotors are configured to tilt independently of one another.

Because at least one of one or more pusher rotors 100 and/or at least one of one or more puller rotors 120 are configured to tilt, aircraft 10 may take off and land vertically and transition between horizontal and vertical flying.

In some examples, one or more pusher rotors 100 and/or one or more puller rotors 120 are configured to be selectively adjusted (e.g., tilted, powered, and/or otherwise operated). For example, one or more pusher rotors 100 and/or one or more puller rotors 120 are configured to be adjusted (e.g., tilted, powered on, powered off, etc.) by a control system. In some such examples, aircraft 10 optionally includes a control system 190 that is configured to selectively adjust various electrically powered components of aircraft 10, including the one or more pusher rotors and/or the one or more puller rotors.

When included, control system 190 includes a controller 191 including a processing unit 192 and a memory unit 194. Memory unit 194 is configured to store computer-readable instructions and processing unit 192 is configured to execute the stored computer-readable instructions to perform various computing functions. For example, processing unit 192 is configured to execute the computer-readable instructions stored in memory unit 194 to tilt the one or more pusher rotors and/or the one or more puller rotors.

Memory unit 194 comprises non-volatile (also referred to herein as "non-transitory") memory 196 (e.g., ROM, PROM, and EPROM) and optionally includes volatile (also referred to herein as "transitory") memory 198 (e.g., RAM, SRAM, and DRAM). Processing unit 192 comprises integrated circuits including one or more of field-programmable gate arrays (FPGAs), application-specific integrated circuits (ASICs), digital signal processors (DSPs), microprocessors, microcontrollers, programmable array logic (PALs), and complex programmable logic devices (CPLDs).

As will be described in greater detail below, controller 191 is programmed to execute various methods, such as the methods schematically represented in FIGS. 6 and 7. In some examples, memory unit 194 is configured to store computer-readable instructions for performing the methods, and processing unit 192 is configured to execute the methods responsive to various inputs. As just one example, processing unit 192 is configured to tilt at least one of the one or more pusher rotors and/or at least one of the one or more puller rotors to adjust the thrust direction (i.e., selectively adjust the relative amount of vertical and horizontal thrust) of aircraft 10. As another example, processing unit 192 is configured to vary the thrust output of the one or more pusher rotors and/or the one or more puller rotors by varying an amount of power (e.g., electrical power) supplied to the one or more pusher rotors and/or the one or more puller rotors.

Aircraft 10 optionally includes one or more motors 164 and/or one or more tilt mechanisms 162 that, in some examples, are configured to be selectively adjusted and/or otherwise controlled by control system 190. When included, one or more motors 164 are configured to rotate one or more pusher rotors 100 and/or one or more puller rotors 120 about rotational axis 110 and rotational axis 130, respectively. In some examples, controller 191 is programmed to selectively adjust an amount of thrust generated by one or more pusher rotors 100 and/or one or more puller rotors 120 by adjusting operation of one or more motors 164. As an example, controller 191 is programmed to adjust a torque output of one or more motors 164 (to selectively adjust the thrust output of the one or more pusher rotors and/or the one or more puller rotors) by adjusting an amount of electrical power supplied to one or more motors 164 (e.g., via pulse width modulation) by a power source 146.

When included, one or more tilt mechanisms 162 are configured to tilt one or more pusher rotors 100 and/or one or more puller rotors 120. In some examples, controller 191 is programmed to selectively tilt one or more pusher rotors 100 and/or one or more puller rotors 120 by adjusting operation of one or more tilt mechanisms 162. As an example, controller 191 is programmed to send electrical command signals (via a wired and/or wireless connection with the one or more tilt mechanisms) that encode for a desired pivot angle of rotational axis 110 and/or rotational axis 130.

The one or more tilt mechanisms comprise one or more of an electromechanical, pneumatic, and hydraulic tilt actuator that is configured to be electronically controlled by controller 191. As examples, one or more tilt mechanisms 162 comprise one or more of a ring-and-pinion, piston-and-bell crank, ball-screw, harmonic drive, multi-link geometry, and/or harmonic drive gearbox.

In some examples, one of the one or more motors and/or one of the one or more tilt mechanisms is/are included for each of the one or more pusher rotors and/or each of the one or more puller rotors. Thus, in some such examples, aircraft 10 includes the same number of tilt mechanisms and/or motors as rotors (e.g., both pusher and puller rotors).

In some examples, one or more motors 164 and/or one or more tilt mechanisms 162 are included and/or otherwise positioned between one or more wings 70 and one or more pusher rotors 100 and/or one or more puller rotors 120. In some such examples, one or more motors 164 and/or one or more tilt mechanisms 162 are included as part of mechanical linkage 160. In particular, one or more motors 164 and/or one or more tilt mechanisms 162 may form a portion of the mechanical linkage that couples and/or otherwise connects one or more pusher rotors 100 and/or one or more puller rotors 120 to one or more wings 70.

Aircraft 10 optionally includes longitudinal crossbars 90. When included, longitudinal crossbars 90 are configured to extend lengthwise between forward set of wings 76 and rearward set of wings 78. In some examples, longitudinal crossbars 90 extend between tips 71 of forward set of wings 76 and rearward set of wings 78.

In some examples, longitudinal crossbars 90 are positioned outboard of one or more pusher rotors 100 and/or one or more puller rotors 120 (i.e., farther from fuselage 22 than one or more pusher rotors 100 and/or one or more puller rotors 120). In some such examples, one or more pusher rotors 100 and/or one or more puller rotors 120 do not extend past longitudinal crossbars 90. In some further such examples, one or more pusher rotors 100 and/or one or more puller rotors 120 are spaced away from longitudinal crossbars 90, more proximate to fuselage 22.

In some examples, longitudinal crossbars 90 include a right-side longitudinal crossbar 92 that extends between one or more right-side wings 74 and a left-side longitudinal crossbar 94 that extends between one or more left-side wings 75. In such examples, one or more pusher rotors 100 and/or one or more puller rotors 120 are included in-between the longitudinal crossbars. Including longitudinal crossbars 90 outboard of one or more pusher rotors 100 and/or one or more puller rotors 120 may reduce the chance that the rotors come into contact with persons and/or foreign objects. That is, longitudinal crossbars 90 may shield persons and/or foreign objects from the one or more pusher rotors and/or the one or more puller rotors. Additionally or alternatively, longitudinal crossbars 90 may form at least a portion of the perimeter of the aircraft (with one or more wings 70 and/or fuselage 22 forming the other portions of the perimeter of the aircraft). As discussed above, positioning one or more pusher rotors 100 and/or one or more puller rotors 120 within, inwardly spaced away from, and/or inwardly spaced farther away from the perimeter of the aircraft, reduces the likelihood that the rotors may come into contact with persons and/or foreign objects. Additionally, longitudinal crossbars 90, when present, increase the stiffness of airframe 20 and eliminates the need for cantilevers, often present in prior art designs and which are prone to vibration issues.

Aircraft 10 optionally includes landing gear 140. When included, landing gear 140 is configured support airframe 20 above ground 210 (also referred to herein as landing surface 210) during and/or after landing. In some examples, landing gear 140 extends from underneath one or more wings 70. Additionally or alternatively, landing gear 140 extends from underneath fuselage 22. In some examples, landing gear 140 includes two landing gears, three landing gears, four landing gears, five landing gear, and/or six or more landing gears. In some such examples, landing gear 140 includes four landing gears, two on forward set of wings 76 and two on rearward set of wings 78 that are positioned on opposite sides of fuselage 22. Positioning landing gear 140 farther from fuselage 22 creates a wider base for which to support airframe 20. In this way, landing gear 140 may provide more stability when on ground 210, and/or may support heavier airframes than landing gear of conventional aircraft.

Figure 5:
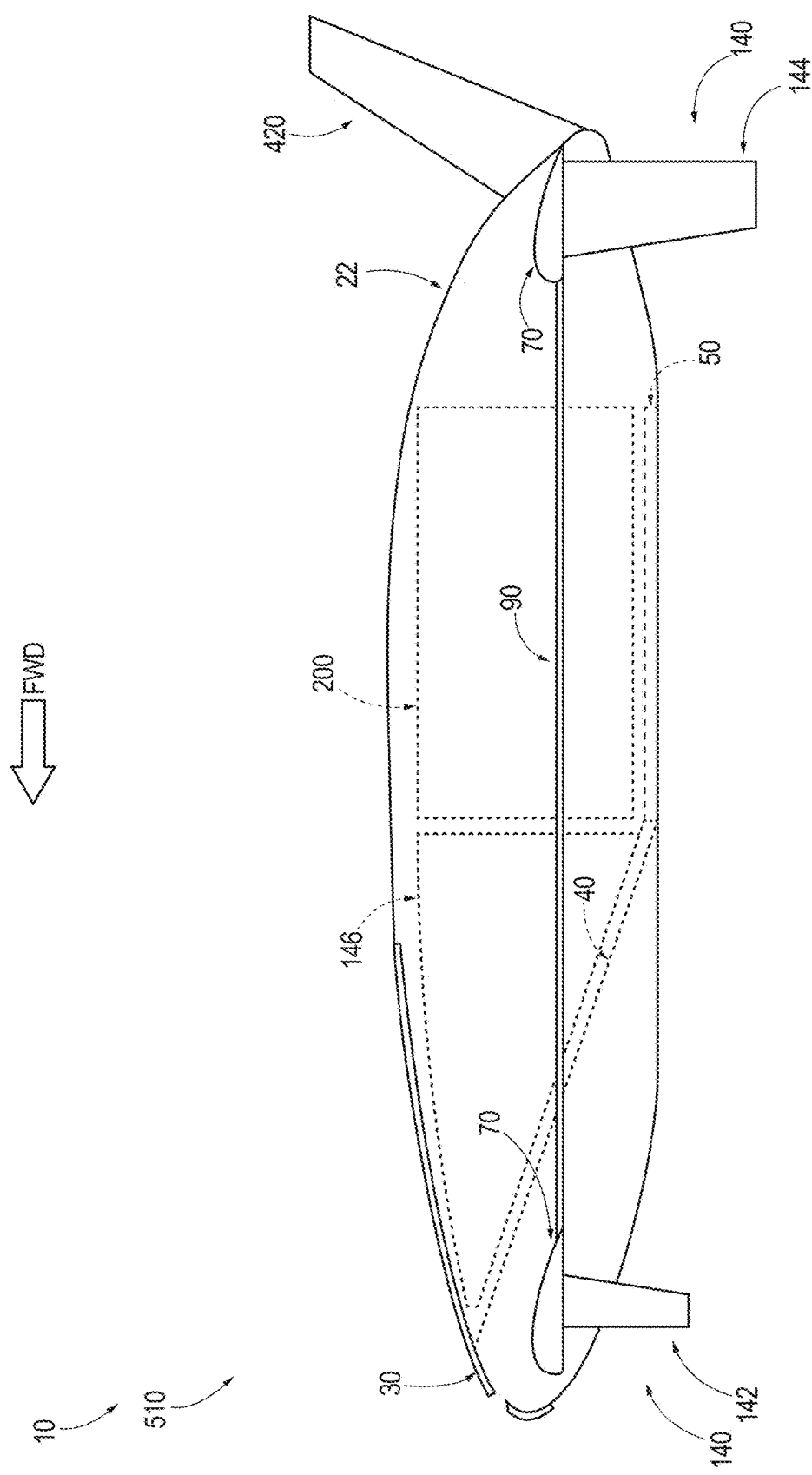
FIG. 5 is a side view of an example rotorcraft illustrating internal components of the rotorcraft, according to the present disclosure.

In some examples, landing gear 140 is configured to orient airframe 20 at a pitch angle relative to ground 210. That is, when on ground 210, the longitudinal axis of airframe 20 is configured to be at an angle with respect to ground. As an example, airframe 20 may be configured to be in a nose-down attitude with respect to ground 210 or may be configured to be a nose-up attitude with respect to ground 210. In one such example (an example of which is illustrated in FIG. 5), front landing gear 142 is configured to be shorter than rear landing gear 144, such that front end 23 of fuselage 22 is closer to ground 210 than rear end 24 of fuselage 22. Such a nose-down stance, in combination with the center of gravity of aircraft 10, for example, may improve liftoff characteristics, stability during liftoff, etc.

In some examples, landing gear 140 is configured to be retracted and/or extended. In some such examples, a length of landing gear 140 is configured to be adjusted. For example, a length of front landing gear 142 is configured to be adjusted relative to a length of rear landing gear 144 depending on a center of gravity of aircraft 10 and/or other flight parameters. Adjusting the relative lengths of the front and rear landing gear may change the attitude of aircraft 10 with respect to ground 210 and may improve liftoff characteristics, stability during liftoff, etc. by compensating for the effects of changes in the center of gravity (such as changes in cargo weight, cargo positioning within fuselage 22, etc.) and/or other flight parameters (e.g., wind speed, wind direction, etc.). In some examples of aircraft 10, landing gear 140 includes wheels or other mechanisms that facilitate maneuvering of aircraft 10 on the ground, including taxiing, for example. In some such examples, the wheels are passive permitting personnel to manually translate the aircraft along the ground, while in other examples, the wheels are powered and may be controlled to translate the aircraft along the ground.

In some examples, aircraft 10 includes one or more loading and/or unloading structures that are configured to facilitate loading and/or unloading of cargo 200 into and/or from aircraft 10. When included, loading and/or unloading structures include one or more of a cargo door 30, a ramp structure 40, a cargo unloading door 50 and/or associated motorized door opening mechanism 58, and a conveyor system 170. Although aircraft 10 is described as including one or more pusher rotors 100 and one or more puller rotors 120, it should be appreciated that in some examples, aircraft 10 includes one or more of the loading and/or unloading structures without including both one or more pusher rotors 100 and one or more puller rotors 120. That is, in some examples, aircraft 10 includes one or more of the loading and/or unloading structures and either one or more pusher rotors 100 or one or more puller rotors 120. In sum, the loading and/or unloading structures may be included in rotorcraft generally, not just push-pull rotorcraft.

In some examples, fuselage 22 comprises a cargo hold 28 that is configured to store cargo 200. Cargo 200 includes one or more of packages, products, goods, and raw materials. In some such examples, cargo hold 28 comprises at least a portion of the hollow interior of fuselage 22 defined by a skin of fuselage 22. In some examples, cargo hold 28 is positioned behind ramp structure 40 and/or cargo door 30. Additionally or alternatively, cargo hold 28 is positioned above (at a vertically higher position than) cargo unloading door 50.

When included, ramp structure 40 is configured to provide a passageway for cargo 200 to advance between cargo door 30 and cargo hold 28. As examples, ramp structure 40 is configured to permit cargo 200 to slide, roll, and/or otherwise advance between cargo door 30 and cargo hold 28. Ramp structure 40 comprises an angled surface 42, also referred to herein as inclined surface 42. Angled surface 42 is at an incline relative to a floor of cargo hold 28 and is at a decline relative to cargo door 30. That is, angled surface 42 extends vertically upward when progressing forward along fuselage 22 (toward front end 23) and extends vertically downward when progressing rearward along fuselage 22 (towards rear end 24). In some examples, cargo door 30 is positioned forward of cargo hold 28, and thus, in such examples, cargo 200 is configured to advance rearwards and downwards on ramp structure 40 when being loaded into cargo hold 28 from cargo door 30, and/or is configured to advance forwards and upwards on ramp structure 40 when being unloaded from cargo hold 28 through cargo door 30.

In some examples, ramp structure 40 is positioned between cargo door 30 and cargo hold 28. In some such examples, ramp structure 40 is positioned forward of cargo hold 28. Additionally or alternatively, ramp structure 40 is positioned below and/or behind cargo door 30.

In some examples, ramp structure 40 extends from cargo hold 28 to cargo door 30 and/or a top 25 of fuselage 22. In some further such examples, ramp structure 40 extends from the front and bottom of cargo hold 28 up to the front of cargo door 30. However, in other such examples, ramp structure 40 stops short of one or more of cargo door 30, top 25 of fuselage 22, and/or cargo hold 28. Stated slightly differently, in such examples, ramp structure 40 extends partially between cargo hold 28 and cargo door 30.

When included, conveyor system 170 is configured to advance cargo 200 into, out of, and/or within fuselage 22. As one example, conveyor system 170 is configured to advance cargo 200 into fuselage 22 via cargo door 30. In another example, conveyor system 170 is configured to advance cargo 200 out of fuselage 22 via cargo door 30. As yet another example, conveyor system 170 is configured to advance cargo 200 along ramp structure 40. In one such example, conveyor system 170 is configured to advance cargo rearwards and downwards along ramp structure 40 towards cargo hold 28 (e.g., when loading cargo 200 onto aircraft 10). Additionally or alternatively, conveyor system 170 is configured to advance cargo upwards and forwards along ramp structure 40 towards cargo door 30 (e.g., when unloading cargo 200 from aircraft 10).

Conveyor system 170 includes one or more of a roller conveyor, belt conveyor, chain conveyor, and/or other suitable conveyor. In particular, conveyor system 170 includes a conveyance medium 172 that is configured to hold and/or carry cargo 200 (e.g., via frictional forces between conveyance medium 172 and cargo 200) and an actuator 174 that is configured to advance, rotate, and/or otherwise move conveyance medium 172. In some examples, actuator 174 comprises an electric motor. In some examples, conveyance medium 172 comprises one or more of rollers, chains, and belts. Thus, when conveyance medium 172 comprises a belt, conveyor system 170 may be referred to as a conveyor belt.

In some examples, conveyor system 170 is included in and/or coupled to ramp structure 40. As an example, ramp structure 40 includes conveyor system 170 and conveyor system 170 forms angled surface 42. In another example conveyor system 170 is positioned above and/or on top of angled surface 42 and/or is coupled to angled surface 42. In some examples, conveyor system 170 extends between cargo hold 28 and cargo door 30. In other examples, conveyor system 170 extends partially between cargo hold 28 and cargo door 30. In yet further examples, conveyor system 170 extends past cargo door 30, out of fuselage 22 and/or into cargo hold 28.

In some examples, conveyor system 170 is configured to be one or more of retracted, extended, and/or repositioned. As examples, conveyor system 170 is configured to retract and/or advance towards cargo hold 28 during flight such that conveyor system 170 is fully included within fuselage 22 during flight and is configured to extend and/or advance forwards, out of fuselage 22 through cargo door 30 after landing to receive and/or deliver cargo 200 from and/or to the outside of aircraft 10.

In yet further examples, conveyor system 170 is an external structure not included in aircraft 10 that is temporarily inserted into fuselage 22 during loading and/or unloading of cargo 200 to facilitate the loading and/or unloading process.

When included, cargo door 30 is configured to selectively open to receive and/or unload cargo 200 through an upper forward portion of fuselage 22. In some examples, cargo door 30 is configured to be adjusted (e.g., pivoted) between a cargo-door closed position 31 and a cargo-door open position 32. As illustrated in FIG. 3, in the cargo-door open position, an opening is formed in fuselage 22 at the upper forward portion of fuselage 22 that permits cargo 200 to pass into and/or out of fuselage 22. In some examples, in cargo-door closed position 31, cargo door 30 is configured to be flush with fuselage 22 and close, seal, and/or otherwise enclose the interior of fuselage 22. In some such examples, when cargo door 30 is in cargo-door closed position 31, cargo 200 cannot exit fuselage 22 via cargo door 30 because cargo door 30 is closed.

In some examples, cargo door 30 is configured to pivot upward when adjusted towards the cargo-door open position 32. In some such examples, a front end of cargo door 30 is configured to pivot upwards and rearwards when the cargo door is adjusted towards the cargo-door open position 32. In some examples, cargo door 30 is configured to pivot at least 80 degrees, such as when adjusting between cargo-door open position 32 and cargo-door closed position 31. In some such examples, cargo door 30 is configured to pivot at least 90 degrees.

In some examples, cargo door 30 is configured to be manually adjusted between cargo-door open position 32 and cargo-door closed position 31 (e.g., by a user). In other examples, cargo door 30 is configured to be electronically adjusted by controller 191. For example, cargo door 30 includes an actuator that is configured to selectively pivot cargo door 30 responsive to control signals received from controller 191. In yet further examples, cargo door 30 includes a passive device that is configured to selectively pivot cargo door 30 responsive to manual adjustment of a locking mechanism. As an example, the locking mechanism includes a latch that, when released manually by a user, permits a compressed spring and/or hydraulic cylinder to expand and pivot the cargo door.

In some examples, cargo door 30 is included in at least a portion of the upper forward portion of the fuselage 22. In some examples, at the forward portion of the fuselage in which cargo door 30 is included, cargo door 30 is at least partially included at a top 25 of forward portion of fuselage 22. That is, cargo door 30 extends to a top of a cross-section of the fuselage in which the cargo door is included. In some examples, cargo door 30 is positioned above (at a vertically higher position) than a floor of cargo hold 28. Thus, in such examples, cargo door 30 is configured to receive and/or unload the cargo from a position vertically higher than the cargo hold. Including cargo door 30 at the upper forward portion of fuselage 22 may facilitate and expedite loading and/or unloading of cargo 200 when cargo 200 is being loaded from, and/or unloaded to, a position vertically higher than the aircraft (e.g., such as when being loaded by a user). In this way, cargo door 30 may enable easier and/or faster loading and/or unloading of aircraft 10.

As discussed above, cargo door 30 is positioned at a forward portion of fuselage 22. In some examples, cargo door 30 is included in a front half of fuselage 22. In some such examples, cargo door 30 is included in a front third of fuselage 22. In some examples, cargo door 30 extends to front end 23 of fuselage 22. However, in other examples, cargo door 30 is positioned behind front end 23 of fuselage 22. That is, in such examples, a front end of cargo door 30 is positioned behind front end 23 of fuselage 22 such that cargo door 30 does not extend all the way to front end 23 of fuselage 22.

When included, cargo unloading door 50 is configured to selectively open to unload cargo 200 through a bottom 26 of fuselage 22. In some examples, cargo unloading door 50 is configured to be adjusted (e.g., pivoted) between a cargo-unloading-door closed position 51 and a cargo-unloading-door open position 52. As illustrated in FIG. 3, in the cargo-unloading-door open position, an opening is formed in fuselage 22 at the bottom of fuselage 22 that permits cargo 200 to pass into and/or out of fuselage 22. In some examples, in cargo-unloading-door closed position 51, cargo unloading door 50 is configured to be flush with fuselage 22 and close, seal, and/or otherwise enclose the interior of fuselage 22 (e.g., cargo hold 28). In some such examples, when cargo unloading door 50 is in cargo-unloading-door closed position 51, cargo 200 cannot exit fuselage 22 via cargo unloading door 50 because cargo unloading door 50 is closed.

In some examples, cargo unloading door 50 is configured to pivot downward when adjusted towards the cargo-unloading-door open position 52. In some examples, cargo unloading door 50 is configured to pivot at least 80 degrees, such as when adjusting between cargo-unloading-door open position 52 and cargo-unloading-door closed position 51. In some such examples, cargo unloading door 50 is configured to pivot at least 90 degrees.

In some examples, cargo unloading door 50 comprises a set of double doors that are configured to open downwards and outwards (away from fuselage 22) in opposite directions. For example, cargo unloading door 50 comprises a first cargo unloading door 54 and a second cargo unloading door 56. A rear end of first cargo unloading door 54 is configured to pivot downwards and forwards when adjusting toward cargo-unloading-door open position 52 and second cargo unloading door 56 is configured to pivot downwards and rearwards when adjusting toward cargo-unloading-door open position 52.

In some examples, cargo unloading door 50 is configured to be electronically adjusted by controller 191. In some such examples, aircraft 10 includes motorized door opening mechanism 58 that is configured to selectively adjust the cargo unloading door between the cargo-unloading-door closed position and the cargo-unloading-door open position. In particular, motorized door opening mechanism 58 is configured to selectively pivot cargo unloading door 50 responsive to control signals received from controller 191. When included, motorized door opening mechanism 58 comprises an electric motor 60 and a power transfer structure 62 that is configured to transfer and/or convert rotational energy output by electric motor 60 to adjust (e.g., pivot) cargo unloading door 50. As an example, power transfer structure 62 includes one or more gears 64. In some such examples, one or more gears 64 include a worm gear 66 and one or more wheel gears 68. In some examples, one or more wheel gears 68 comprise quarter-wheel gears. As worm gear 66 rotates, worm gear 66 causes wheel gears 68 to pivot and/or rotate. One or more wheel gears 68 in turn may be in a locked rotational engagement with cargo unloading door 50 such that rotation and/or pivoting of wheel gears 68 causes cargo unloading door 50 to pivot. A same and/or similar motorized door opening mechanism may additionally or alternatively be utilized to open and/or close cargo door 30.

In other examples, cargo unloading door 50 is configured to be manually adjusted between cargo-unloading-door open position 52 and cargo-unloading-door closed position 51 (e.g., by a user). In yet further examples, cargo unloading door 50 includes a passive device that is configured to selectively pivot cargo unloading door 50 responsive to manual adjustment of a locking mechanism. As an example, the locking mechanism includes a latch that, when released manually by a user, permits a compressed spring and/or hydraulic cylinder to expand and pivot the cargo unloading door.

In some examples, cargo unloading door 50 is included below cargo door 30 (i.e., at a vertically lower position on fuselage 22 than cargo door 30). In some such examples, in the portion of fuselage 22 in which it is included, cargo unloading door 50 extends to bottom 26 of fuselage 22 and/or is at least partially included on bottom 26 of fuselage 22. Thus, in such examples, cargo unloading door 50 extends to the bottom cross-section of fuselage 22 in which cargo unloading door 50 is included. In some examples, cargo unloading door 50 is included below (at a vertically lower position than) cargo hold 28. In some such examples, cargo unloading door 50 is included directly below and/or underneath cargo hold 28, such that upon opening of cargo unloading door 50, cargo 200 in cargo hold 28 is configured to drop out of aircraft 10 onto landing surface 210.

Additionally or alternatively, cargo unloading door 50 is positioned rearward (behind) cargo door 30. As one such example, cargo unloading door 50 is positioned at an intermediate portion of fuselage 22, behind the upper forward portion of fuselage 22 where cargo door 30 is included, and/or behind ramp structure 40.

In this way, cargo unloading door 50 may facilitate faster and/or easier unloading of cargo 200 from aircraft 10. As an example, when cargo unloading door 50 is positioned directly underneath cargo hold 28, cargo 200 may be unloaded from aircraft 10 without requiring any user intervention. Upon opening of cargo unloading door 50, cargo 200 may fall out of cargo hold 28 and onto landing surface 210 under the force of gravity alone. As another example, when motorized door opening mechanism 58 is included, cargo unloading door 50 may be opened without requiring user intervention. Thus, the entire unloading process, from door opening to cargo extraction may be entirely automated.

In some examples where landing gear 140 is included in aircraft 10, cargo unloading door 50 is shorter than landing gear 140 and/or otherwise does not extend below landing gear 140 when in cargo-unloading-door open position 52. In this way, cargo unloading door 50 may not come into contact with landing surface 210.

In some examples, aircraft 10 includes power source 146. When included, power source 146 is configured to supply electrical power to aircraft 10, and in particular, to the electrically powered devices of aircraft 10, such as one or more of controller 191, tilt mechanism 162, one or more motors 164, actuator 174, and electric motor 60. As an example, power source 146 comprises a battery. In such examples, the battery comprises a rechargeable battery (such as a lithium-ion battery) and/or a disposable battery.

In some examples, power source 146 is configured to retain cargo 200 in cargo hold 28 and/or otherwise restrict movement of cargo 200 out of cargo hold 28. As an example, power source 146 is included forward of cargo hold 28 and is configured to restrict forward movement of cargo 200 from cargo hold 28. Additionally or alternatively, power source 146 is positioned and/or included above and/or on top of ramp structure 40 and/or conveyor system 170. As one such example, power source 146 is positioned above and/or on top of angled surface 42 of ramp structure 40. In some such examples, power source 146 is positioned and/or included in-between angled surface 42 and cargo door 30 (e.g., directly underneath cargo door 30). Including power source 146 underneath cargo door 30 makes power source 146 more accessible to a user, enabling faster and/or easier charging, refueling, etc., and/or replacement, of power source 146. This may be particularly useful when power source 146 is a rechargeable battery, where charging and/or replacement of power source 146 occurs more frequently.

Including ramp structure 40 and/or power source 146 forward of cargo hold 28 may restrict and/or prevent drift of cargo 200 during flight, particularly forward drift of cargo 200. Reducing such cargo shifting during flight may help aircraft 10 maintain more stable flight and/or may otherwise improve flight characteristics.

Further positioning ramp structure 40 and/or power source 146 forward of cargo hold 28 and/or positioning cargo hold 28 in the intermediate section of fuselage 22 may shift the center of gravity of aircraft 10 forward as compared to conventional aircraft and/or may improve flight characteristics. That is, because of the positioning of one or more of cargo hold 28 (and cargo 200 in cargo hold 28), ramp structure 40, and/or power source 146, aircraft 10 may have a more forward center of gravity as compared to conventional delivery aircraft which may improve flight characteristics. Moreover, by having such structures as ramp structure 40 and/or power source 146 positioned forward of cargo hold 28, when cargo 200 is present, the location of the ramp structure 40 and/or power source 146 counterbalances the weight of cargo 200, resulting in a desired center of gravity for aircraft 10.

In some examples, power source 146 is configured to be selectively coupled to aircraft 10 via mating coupling mechanisms in the power source and the aircraft. As an example, power source 146 includes a first coupling mechanism 148, and aircraft 10 includes a second coupling mechanism 180 that is configured to selectively engage with first coupling mechanism 148 to couple power source 146 to aircraft 10. First coupling mechanism 148 and second coupling mechanism 180 may comprise any suitable releasable coupling mechanism such as frictional and/or magnetic type releasable coupling mechanisms.

As one example, first coupling mechanism 148 and second coupling mechanism 180 comprise a pin and socket arrangement, where second coupling mechanism 180 comprises a socket, and first coupling mechanism 148 comprises one or more pins and springs. In one such example, when a user carries power source 146 (e.g., by a top handle), the upward force provided by the user is configured to hyperextend the pins, which in turn pulls the pins inwards away from and/or out of the socket (thereby decoupling power source 146 from aircraft 10). When the user sets power source 146 down and/or otherwise releases the handle, the spring retracts and/or compresses, pushing the pins outward into the socket (thereby coupling power source 146 to aircraft 10). However, first coupling mechanism 148 and second coupling mechanism 180 comprise other frictional releasable locking mechanism in other examples, such as one or more of friction fits, latches, threaded engagements, bayonet locks, and/or other pin and socket arrangements.

In some examples, ramp structure 40 includes second coupling mechanism 180 and power source 146 is configured to be selectively coupled to ramp structure 40 and/or conveyor system 170. In such examples, power source 146 rests on top of ramp structure 40 and/or conveyor system 170. In other examples, cargo door 30 includes second coupling mechanism 180 and power source 146 is configured to be selectively coupled to cargo door 30. In some such examples, power source 146 rests on top of (and physically touches and/or otherwise contacts) ramp structure 40 and/or conveyor system 170 when cargo door 30 is in cargo-door closed position 31. In other such examples, power source 146 is spaced away from (above) ramp structure 40 and/or conveyor system 170 when cargo door 30 is in cargo-door closed position 31. However, in other examples, other structures in aircraft 10, such as fuselage 22, additionally and/or alternatively include second coupling mechanism 180 and are configured to be selectively coupled to cargo door 30.

In some examples, power source 146 is configured to be selectively electrically connected to aircraft 10 (and specifically to the one or more electrically powered devices of aircraft 10) via electrical connections included in the power source and the aircraft. As an example, power source 146 includes a first electrical connector 147, and aircraft 10 includes a second electrical connector 178 that is configured to selectively electrically connect (e.g., via a wired and/or wireless connection) with first electrical connector 147, to enable power source 146 to supply power to the electrically powered devices of aircraft 10.

In some examples, ramp structure 40 includes second electrical connector 178 and ramp structure 40 is configured to electrically connect with power source 146 to provide power to aircraft 10. In another example, conveyor system 170 includes second electrical connector 178 and conveyor system 170 is configured to electrically connect with power source 146 to provide power to aircraft 10. In another example, cargo door 30 includes second electrical connector 178 and cargo door 30 is configured to electrically connect with power source 146 to provide power to aircraft 10. However, in other examples, other structures in aircraft 10, such as fuselage 22, additionally or alternatively include second electrical connector 178 and are configured to selectively electrically connect with power source 146 to provide power to aircraft 10.

In some examples, aircraft 10 comprises an unmanned, autonomous vehicle, such as a delivery vehicle for cargo 200. In some examples, aircraft 10 is entirely an electrically powered aircraft. In other examples, aircraft 10 is a hybrid aircraft.

In some examples, aircraft 10 is at most 20 meters (m) in length, 15 m in length, 10 m in length, 5 m in length, 4 m in length, 3 m in length, 2 m in length, and/or 1 m in length. In some examples, aircraft 10 is at most 20 m in width, 15 m in width, 10 m in width, 5 m in width, 4 m in width, 3 m in width, 2 m in width, and/or 1 m in width.

Turning now to FIGS. 4-5, non-exclusive examples of aircraft 10 are illustrated. Where appropriate, the reference numerals from the schematic illustrations of FIGS. 1-3 are used to designate corresponding parts of the examples of FIGS. 1-3; however, the examples of FIGS. 4-5 are non-exclusive and do not limit aircraft 10 to the illustrated embodiments of FIGS. 4-5. That is, aircraft 10 are not limited to the specific embodiments of FIGS. 4-5, and aircraft 10 may incorporate any number of the various aspects, configurations, characteristics, properties, etc. of aircraft 10 that are illustrated in and discussed with reference to the schematic representations of FIGS. 1-3 and/or the embodiments of FIGS. FIGS. 4-5 as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 4-5; however, it is within the scope of the present disclosure that the previously discussed features, variants, etc. may be utilized with the examples of FIGS. 4-5.

As seen in FIG. 4, aircraft 410 is an example of an aircraft 10. Aircraft 410 comprises forward set of wings 76 and rearward set of wings 78. Further, aircraft 410 comprises eight total rotors, four of one or more pusher rotors 100 and four of one or more puller rotors 120. Each of one or more pusher rotors 100 and each of one or more puller rotors 120 of aircraft 410 includes two rotor blades. Aircraft 410 additionally includes four of landing gear 140, one off each of the wings. Longitudinal crossbars 90 extend between forward set of wings 76 and rearward set of wings 78, outboard of all of the rotors. Thus, all of the rotors of aircraft 410 are included between the wings and the longitudinal crossbars. In some examples, aircraft 410 additionally includes a tail 420.

As seen in FIG. 5, aircraft 510 is an example of an aircraft 10. FIG. 5 illustrates a side view of aircraft 510 with internal components of aircraft 510 illustrated in dotted lines. For example, power source 146, cargo 200, and ramp structure 40 are illustrated in dotted lines. As illustrated, power source 146 restricts and/or prevents forward movement of cargo 200. Further, front landing gear 142 of aircraft 510 is shorter than rear landing gear 144. Aircraft 510 additionally includes tail 420.

FIGS. 6-7 schematically provide flowcharts that represent illustrative, non-exclusive examples of methods according to the present disclosure. In FIGS. 6-7, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 6-7 are not limiting and other methods and steps are within the scope of the present disclosure, including methods having greater than or fewer than the number of steps illustrated, as understood from the discussions herein.

FIG. 6 schematically provides flowcharts of methods 600 for loading and/or unloading an aircraft (e.g., aircraft 10), and FIG. 7 schematically provides flowcharts of methods for loading and/or unloading cargo (e.g., cargo 200) from the aircraft.

Methods 600 include loading cargo into a fuselage (e.g., fuselage 22) of the aircraft through an upper forward portion of the fuselage at 602. In some examples, loading the cargo at 602 includes one or more of opening a cargo door (e.g., cargo door 30) positioned at the upper forward portion of the fuselage at 604, advancing cargo rearward and downward toward a cargo hold (e.g., cargo hold 28) at 606, and closing the cargo door at 608. In examples, where aircraft includes more than one cargo door, the cargo door through which cargo is loaded at 602 is referred to herein as first cargo door (e.g., cargo door 30).

The opening the cargo door at 604 includes opening the cargo door to create an opening in the upper forward portion of the fuselage. After the opening the cargo door at 604, the loading at 602 optionally includes inserting the cargo into the aircraft through the opening in the upper forward portion of the fuselage.

Advancing the cargo rearward and downward at 606 optionally includes pushing, sliding, rolling, and/or otherwise advancing the cargo rearward and downward towards the cargo hold. In some such examples, the advancing the cargo rearward and downward towards the cargo hold includes pushing, sliding, rolling, and/or otherwise advancing the cargo on an angled surface (e.g., angled surface 42) of a ramp structure (e.g., ramp structure 40) towards and/or into the cargo hold. In some examples, the advancing at 606 includes powering a conveyor system (e.g., conveyor system 170) to advance the cargo rearward and downward towards and/or into the cargo hold. In some such examples, the advancing at 606 includes advancing the cargo via the conveyor system such that the cargo is advanced rearward and downward on the conveyor system. In some examples, the advancing at 606 is performed after the opening at 604.

At 620, methods 600 optionally include loading a power source (e.g., power source 146) into the fuselage in front of the cargo in the cargo hold. In some examples, the loading the power source at 620 is performed after the advancing the cargo rear and downward at 606, but before the closing the cargo door at 608. As an example, methods 600 include the advancing the cargo into the cargo hold at 606, the loading the power source in front of the cargo at 620, and then the closing the cargo door at 608. In some examples, the loading the power source at 620 includes mechanically coupling and/or electrically connecting the power source to the aircraft. As one such example, the loading at 620 includes mechanically coupling the power source to the ramp structure. In another example, the loading at 620 includes mechanically coupling the power source to the cargo door. In yet another example, the loading at 620 includes mechanically coupling the power source to the fuselage. In some examples, the loading the power source at 620 includes positioning and/or placing the power source above and/or on top of the ramp structure, and in front of the cargo hold.

At 640, methods 600 optionally include unloading the cargo from the aircraft. In some examples, the unloading at 640 includes unloading the cargo through the upper forward portion of the fuselage at 642. In some such examples, the unloading at 642 includes opening the cargo door to create the opening in the upper forward portion of the fuselage.

In some examples, the unloading at 640 includes extracting the cargo from the aircraft through the opening in the upper forward portion of the fuselage. In some such examples, the extracting includes pulling the cargo upwards and forwards out of the cargo hold. In some examples, the extracting is performed after opening the first cargo door. In some such examples, the pulling comprises sliding the cargo upwards and forwards out of the cargo hold on a ramp structure. In some further such examples, the extracting the cargo from the cargo hold further comprises powering the conveyor system and advancing the cargo upwards and forwards towards the cargo door and away from the cargo hold via the conveyor system.

Unloading the cargo at 640 optionally includes unloading the cargo through a bottom (e.g., bottom 26) of the fuselage via a second cargo door (e.g., cargo unloading door 50) at 644. In some examples, unloading the cargo through the bottom of the fuselage at 644 includes opening the second cargo door (also referred to herein as "cargo unloading door") positioned on the bottom of the fuselage. In some examples, the opening the cargo unloading door comprises powering a motorized door opening mechanism (e.g., motorized door opening mechanism 58).

In some examples, methods 600 are performed by a user to load and/or unload the aircraft. However, the aircraft, specifically a controller (e.g., controller 191) of the aircraft may perform one or more of methods 600, such as the powering of the conveyor system and/or the opening of the cargo unloading door.

Methods 700 include receiving cargo (e.g., cargo 200) through a first cargo door (e.g., cargo door 30) positioned on a top (e.g., top 25) of a fuselage of an aircraft at 702, and unloading the cargo through a second cargo door (e.g., cargo unloading door 50) positioned on a bottom (e.g., bottom 26) of the fuselage of an aircraft (e.g., aircraft 10) at 712. In some examples, the receiving cargo through the first cargo door optionally includes opening the first cargo door to create an opening through which to receive the cargo. Thus, in some such examples, opening the cargo door is performed prior to receiving the cargo. In some examples, the cargo is received in a cargo hold (e.g., cargo hold 28) after being received through the first cargo door. As an example, the receiving the cargo through the first cargo door at 702 optionally includes powering on a conveyor system (e.g., conveyor system 170) to advance the cargo rearwards and downwards from the first cargo door into the cargo hold.

In some examples, unloading the cargo at 708 optionally includes unloading the cargo through the first cargo door at 710. Additionally or alternatively, the unloading at 708 includes the unloading the cargo through the second cargo door positioned on a bottom portion of the aircraft at 712. In some such examples, the unloading the cargo through the second cargo door at 712 includes opening the second cargo door at 714. The opening the second cargo door at 714 optionally includes powering a motorized door opening mechanism (e.g., motorized door opening mechanism 58). In some examples, the opening the second cargo door at 714 includes dropping the cargo out of the cargo hold. In particular, upon opening the second cargo door, the cargo is configured to drop out of the cargo hold onto a landing surface (e.g., landing surface 210).

Methods 700 optionally include keeping the second cargo door open and lifting off from the landing surface after unloading the cargo through the second cargo door at 704. In some examples, methods 700 include closing the second cargo door after the aircraft has lifted off the landing surface.

Methods 700 optionally include landing on the landing surface at 706. In some examples, the aircraft lands on the landing surface prior to receiving the cargo at 702. In some examples, the aircraft lands on the landing surface prior to unloading the cargo at 708. In this way, the cargo may be loaded into and/or unloaded from the aircraft after the aircraft has landed.

In some examples, methods 700 are performed by the aircraft. In some such examples, methods 700 are performed by a control system (e.g., control system 190) including a controller (e.g., controller 191). As explained above, the controller may include computer-readable instructions stored in non-transitory memory (e.g., non-transitory memory 196) for performing one or more of methods 700 and the controller may include a processor (e.g., processing unit 192) that is configured to execute the computer-readable instructions to perform one or more of methods 700. Some methods 700 are performed autonomously. For example, the control system may cause the aircraft's guidance, navigation, and/or control by controlling actuation of flight control surfaces such as rotors and tilting mechanisms. The control system may be equipped with a navigation system (such as GPS or INS (inertial navigation system)) or other sensors to execute the navigation of the aircraft (i.e. travel from point A to B). Other sensors, such as LiDAR or cameras may be used to assist in situational awareness of the aircraft as it travels.

A controller may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Additionally or alternatively, a controller may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

Illustrative, non-exclusive examples of inventive subject matter according to the present disclosure are described in the following enumerated paragraphs:

A. An aircraft (10), comprising:

an airframe (20) comprising one or more wings (70);

one or more pusher rotors (100) supported by the airframe (20); and one or more puller rotors (120) supported by the airframe (20).

A1. The aircraft (10) of paragraph A, wherein the one or more puller rotors (120) are positioned behind the one or more pusher rotors (100).

A2. The aircraft (10) of any of paragraphs A-A1, wherein the aircraft (10) is configured to take off and land vertically.

A2.1. The aircraft (10) of paragraph A2, wherein the aircraft (10) is configured to selectively adjust an amount of vertical thrust and/or an amount of horizontal thrust by tilting at least one of the one or more pusher rotors (100) and/or at least one of the one or more puller rotors (120).

A3. The aircraft (10) of paragraph A2.1, wherein a rotational axis (110) of the at least one of the one or more pusher rotors (100) is configured to be selectively tilted towards a longitudinal axis (16) of the aircraft (10) to increase horizontal thrust and/or reduce vertical thrust, and wherein the at least one of the one or more pusher rotors (100) is configured to be selectively tilted away from the longitudinal axis (16) to reduce horizontal thrust and/or increase vertical thrust.

A4. The aircraft (10) of paragraph A3, wherein the at least one of the one or more pusher rotors (100) is configured to be selectively tilted between a vertical thrusting push position (102) and a horizontal thrusting push position (104).

A5. The aircraft (10) of paragraph A4, wherein the at least one of the one or more pusher rotors (100) generates thrust in an upward vertical direction in the vertical thrusting push position (102) and generates thrust in a forward horizontal direction in the horizontal thrusting push position (104).

A6. The aircraft (10) of any of paragraphs A4-A5, wherein the one or more pusher rotors (100) face downwards in the vertical thrusting push position (102) and face rearward in the horizontal thrusting push position (104).

A7. The aircraft (10) of any of paragraphs A2.1-A6, wherein the at least one of the one or more pusher rotors (100) is configured to tilt when the aircraft (10) is transitioning between a hover mode and a cruise mode.

A8. The aircraft (10) of any of paragraphs A2.1-A7, wherein the at least one of the one or more pusher rotors (100) is configured to be individually tilted such that when two or more of the pusher rotors (100) are configured to be tilted, the two or more of the pusher rotors (100) are configured to be tilted independently of one another.

A9. The aircraft (10) of any of paragraphs A3-A8, wherein a rotational axis (130) of the at least one of the one or more puller rotors (120) is configured to be selectively tilted towards the longitudinal axis (16) of the aircraft (10) to increase horizontal thrust and/or reduce vertical thrust, and wherein the at least one of the one or more puller rotors (120) is configured to be selectively tilted away from the longitudinal axis (16) to reduce horizontal thrust and/or increase vertical thrust.

A10. The aircraft (10) of paragraph A9, wherein the at least one of the one or more puller rotors (120) is configured to be selectively tilted between a vertical thrusting pull position (122) and a horizontal thrusting pull position (124).

A11. The aircraft (10) of paragraph A10, wherein the at least one of the one or more puller rotors (120) generates thrust in an upward vertical direction in the vertical thrusting pull position (122) and generates thrust in a forward horizontal direction in the horizontal thrusting pull position (124).

A12. The aircraft (10) of any of paragraphs A10-A11, wherein the one or more puller rotors (120) face upwards in the vertical thrusting pull position (122) and face forwards in the horizontal thrusting pull position (124).

A13. The aircraft (10) of any of paragraphs A8-A12 when depending from paragraph A7, wherein the at least one of the one or more puller rotors (120) is configured to tilt when the aircraft (10) is transitioning between the hover mode and the cruise mode.

A14. The aircraft (10) of any of paragraphs A9-A13, wherein the at least one of the one or more puller rotors (120) is configured to be individually tilted such that when two or more of the puller rotors (120) are configured to be tilted, the two or more of the puller rotors (120) are configured to be tilted independently of one another.

A15. The aircraft (10) of any of paragraphs A9-A14 when depending from any of paragraphs A3-A8, wherein the at least one of the one or more pusher rotors (100) is configured to be tilted independently of the at least one of the one or more puller rotors (120).

A16. The aircraft (10) of paragraph A15, wherein the at least one of the one or more pusher rotors (100) is configured to tilt in an opposite rotational direction to the at least one of the one or more puller rotors (120).

A17. The aircraft (10) of any of paragraphs A15-A16 when depending from any of paragraphs A2-A14, wherein, when transitioning to the cruise mode, the at least one of the one or more pusher rotors (100) is configured to tilt vertically upwards and the at least one of the one or more puller rotors (120) is configured to tilt vertically downwards.

A18. The aircraft (10) of any of paragraphs A-A17, wherein the one or more wings (70) comprise a forward set of wings (76) and an aft set of wings (78).

A19. The aircraft (10) of paragraph A18, wherein the one or more pusher rotors (100) extend behind a trailing edge (73) of the forward set of wings (76), and wherein the one or more puller rotors (120) extend in front of the leading edge (72) of the aft set of wings (78).

A20. The aircraft (10) of any of paragraphs A18-A19, wherein the one or more pusher rotors (100) and the one or more puller rotors (120) are positioned between the forward set of wings (76) and the aft set of wings (78).

A21. The aircraft (10) of any of paragraphs A18-A20 when depending from any of paragraphs A10-A16, wherein the one or more pusher rotors (100) are positioned behind the forward set of wings (76) in the horizontal thrusting push position (104) and wherein the one or more puller rotors (120) are positioned in front of the aft set of wings (78) in the horizontal thrusting pull position (124).

A22. The aircraft (10) of paragraph A21, wherein the one or more pusher rotors (100) are positioned behind a trailing edge (73) of the forward set of wings (76) and wherein the one or more puller rotors (120) are positioned in front of a leading edge (72) of the aft set of wings (78).

A23. The aircraft (10) of any of paragraphs A-A22, wherein the one or more pusher rotors (100) and the one or more puller rotors (120) are positioned such that they are vertically offset from one another.

A24. The aircraft (10) of paragraph A23 when depending from any of paragraphs A4-A6 and any of paragraphs A10-A12, wherein when the one or more pusher rotors (100) are in the vertical thrusting push position (102) and the one or more puller rotors (120) are in the vertical thrusting pull position (122), the one or more pusher rotors (100) are located at a vertically lower position than the one or more puller rotors (120).

A25. The aircraft (10) of paragraph A24, wherein when the one or more pusher rotors (100) are in the horizontal thrusting push position (104) and the one or more puller rotors (120) are in the horizontal thrusting pull position (124), the one or more pusher rotors (100) are located at a vertically higher position than the one or more puller rotors (120).

A26. The aircraft (10) of any of paragraphs A-A25, further comprising landing gear (140).

A27. The aircraft (10) of paragraph A26, when depending from any of paragraphs A18-A22, wherein the landing gear (140) comprises front landing gear (142) that is coupled to the forward set of wings (76).

A28. The aircraft (10) of any of paragraphs A26-A27 when depending from any of paragraphs A18-A22, wherein the landing gear (140) comprises rear landing gear (144) that is coupled to the aft set of wings (78).

A29. The aircraft (10) of paragraph A28 when depending from paragraph A27, wherein the rear landing gear (144) is longer than the front landing gear (142).

A30. The aircraft (10) of any of paragraphs A18-A29, further comprising longitudinal crossbars (90) that extend lengthwise between the forward set of wings (76) and the aft set of wings (78).

A31. The aircraft (10) of paragraph A30, wherein the longitudinal crossbars (90) are positioned outboard of the one or more pusher rotors (100) and the one or more puller rotors (120) such that the one or more pusher rotors (100) and the one or more puller rotors (120) are positioned between the longitudinal crossbars (90).

A32. The aircraft (10) of any of paragraphs A30-A31, wherein the longitudinal crossbars (90) extend between tips (71) of the forward set of wings (76) and the aft set of wings (78).

A33. The aircraft (10) of any of paragraphs A30-A32, wherein the longitudinal crossbars (90) comprise a right-side longitudinal crossbar (92) and a left-side longitudinal crossbar (94).

A34. The aircraft (10) of any of paragraphs A-A33, wherein the aircraft (10) is an unmanned electric aircraft.

A35. A method of operating the aircraft of any of paragraphs A-A34, comprising:
  operating the aircraft (10) in a/the hover mode by tilting the one or more pusher rotors (100) relative to the airframe (20) to a/the vertical thrusting push position (102) and tilting the one or more puller rotors (120) relative to the airframe (20) to a/the vertical thrusting pull position (122); and
  operating the aircraft (10) in a/the cruise mode by tiling the one or more pusher rotors (100) relative to the aircraft (10) to a/the horizontal thrusting push position (104) and tiling the one or more puller rotors (120) relative to the aircraft (10) to a/the horizontal thrusting pull position (124).

A36. The method of paragraph A35, further comprising the method of any of paragraphs C-D4.

B. An aircraft (10), comprising:
  a fuselage (22) comprising a cargo hold (28) configured to store cargo (200);
  a cargo door (30) configured to selectively open to receive the cargo (200) through an upper forward portion of the fuselage (22); and
  a ramp structure (40) included within the fuselage (22), wherein the ramp structure (40) is configured to provide a passageway for the cargo (200) to advance between the cargo door (30) and the cargo hold (28).

B1. The aircraft (10) of paragraph B, wherein the cargo door (30) is configured to selectively open to unload the cargo (200) through the upper forward portion of the fuselage (22).

B2. The aircraft (10) of any of paragraphs B-B1, wherein the cargo door (30) is configured to receive and/or unload the cargo (200) from a position vertically higher than the cargo hold (28).

B3. The aircraft (10) of any of paragraphs B-B2, wherein the cargo door (30) is included in at least a portion of the upper forward portion of the fuselage (22).

B4. The aircraft (10) of any of paragraphs B-B3, wherein the cargo door (30) extends to a top of a cross-section of the fuselage (22) in which the cargo door (30) is included.

B5. The aircraft (10) of any of paragraphs B-B4, wherein the cargo door (30) is included in a front half of the aircraft (10).

B6. The aircraft (10) of paragraph B5, wherein the cargo door (30) is included in a front third of the aircraft (10).

B7. The aircraft (10) of any of paragraphs B-B6, wherein the cargo door (30) is positioned behind a front end (23) of the fuselage (22).

B8. The aircraft (10) of any of paragraphs B-B7, wherein the cargo door (30) is configured to be adjusted between a cargo-door closed position (31) and a cargo-door open position (32).

B9. The aircraft (10) of paragraph B8, wherein the cargo door (30) is configured to pivot upward when adjusted towards the cargo-door open position (32).

B10. The aircraft (10) of any of paragraphs B8-B9, wherein the cargo door (30) is configured to pivot at least 80 degrees.

B11. The aircraft (10) of any of paragraphs B-B10, wherein the ramp structure (40) is positioned in front of the cargo hold (28).

B12. The aircraft (10) of any of paragraphs B-B11, wherein the ramp structure (40) is positioned below the cargo door (30).

B13. The aircraft (10) of any of paragraphs B-12, wherein the ramp structure (40) is positioned between the cargo door (30) and the cargo hold (28).

B14. The aircraft (10) of any of paragraphs B12-B13, wherein the ramp structure (40) extends to the cargo door (30) of the aircraft (10).

B15. The aircraft (10) of any of paragraphs B-B14, wherein the ramp structure (40) is fully included within the fuselage (22).

B16. The aircraft (10) of any of paragraphs B-B15, wherein, when the cargo (200) is advanced along the ramp structure (40) towards the cargo hold (28), the ramp structure (40) is configured to lower the cargo (200) in the fuselage (22).

B17. The aircraft (10) of any of paragraphs B-B16, wherein the ramp structure (40) includes an inclined surface (42).

B18. The aircraft (10) of paragraph B17, wherein the inclined surface (42) slopes downwards from the cargo door (30) to the cargo hold (28).

B19. The aircraft (10) of any of paragraphs B-B18, wherein the ramp structure (40) is configured to permit the cargo (200) to slide into the cargo hold (28).

B20. The aircraft (10) of any of paragraphs B-B19, further comprising a conveyor system (170) configured to advance the cargo (200) rearwards towards the cargo hold (28).

B21. The aircraft (10) of paragraph B20, wherein the conveyor system (170) extends between the cargo door (30) and the cargo hold (28).

B22. The aircraft (10) of any of paragraphs B20-B21, wherein the conveyor system (170) is electrically powered.

B23. The aircraft (10) of any of paragraphs B20-B22, wherein the conveyor system (170) comprises a conveyor belt.

B24. The aircraft (10) of any of paragraphs B20-B23, wherein the ramp structure (40) comprises at least a portion of the conveyor system (170).

B25. The aircraft (10) of any of paragraphs B-B24, further comprising a cargo unloading door (50) configured to selectively open to unload the cargo (200) through a bottom (26) of the fuselage (22).

B26. The aircraft (10) of paragraph B25, wherein the cargo unloading door (50) is included at a vertically lower position on the fuselage (22) than the cargo door (30).

B27. The aircraft (10) of any of paragraphs B25-B26, wherein the cargo unloading door (50) is configured to selectively open to unload the cargo (200) through an intermediate portion of the bottom (26) of the fuselage (22).

B28. The aircraft (10) of any of paragraphs B25-B27, wherein the cargo unloading door (50) is configured to selectively open to drop the cargo (200) out of the cargo hold (28) to a landing surface (210).

B29. The aircraft (10) of any of paragraphs B25-B28, wherein the cargo unloading door (50) is positioned directly underneath the cargo hold (28).

B30. The aircraft (10) of any of paragraphs B25-B29, wherein the cargo unloading door (50) is positioned behind the cargo door (30).

B31. The aircraft (10) of any of paragraphs B25-B30, wherein the cargo unloading door (50) extends to a bottom of an unloading door cross-section of the fuselage (22) in which the cargo unloading door (50) is included.

B32. The aircraft (10) of any of paragraphs B25-B31, wherein the cargo unloading door (50) is configured to be adjusted between a cargo-unloading-door closed position (51) and a cargo-unloading-door open position (52).

B33. The aircraft (10) of any of paragraphs B25-B32, wherein the cargo unloading door (50) comprises a set of double doors (54 and 56).

B34. The aircraft (10) of paragraph B33 when depending from paragraph B32, wherein the double doors (54 and 56) are configured to pivot in opposite rotational directions.

B35. The aircraft (10) of any of paragraphs B32-B34, further comprising a motorized door opening mechanism (58) that is configured to selectively adjust the cargo unloading door (50) between the cargo-unloading-door closed position (51) and the cargo-unloading-door open position (52).

B36. The aircraft of any of paragraphs B-B35, further comprising a power source (146).

B37. The aircraft (10) of paragraph B36, wherein the power source (146) comprises a battery.

B38. The aircraft (10) of any of paragraphs B36-B37, wherein the ramp structure (40) comprises a power source connector that is configured to selectively electrically connect to the power source (146) to provide electrical power to the aircraft (10).

B39. The aircraft (10) of any of paragraphs B36-B38, wherein the power source (146) is configured to be selectively mechanically coupled to the fuselage (22).

B40. The aircraft (10) of any of paragraphs B36-B39, wherein the power source (146) is positioned forward of the cargo hold (28).

B41. The aircraft (10) of paragraph B40, wherein the power source (146) is configured to be selectively coupled to the ramp structure (40).

B42. The aircraft (10) of any of paragraphs B36-B41, wherein the power source (146) is configured to retain the cargo (200) in the cargo hold (28).

B43. The aircraft (10) of any of paragraphs A-A34, further comprising the subject matter of any of paragraphs B-B41.

C. A method (600) for loading cargo (200) on to an aircraft (10), the method (600) comprising:

loading (602) cargo (200) into a fuselage (22) of the aircraft (10) through an upper forward portion of the fuselage (22).

C1. The method (600) of paragraph C, wherein the loading (602) comprises opening (604) a first cargo door (30) included in the upper forward portion of the fuselage (22) to create an opening in the upper forward portion of the fuselage (22).

C2. The method (600) of paragraph C1, wherein, after the opening (604) the first cargo door (30), the loading further comprises inserting the cargo (200) into the aircraft (10) through the opening in the upper forward portion of the fuselage (22).

C3. The method (600) of any of paragraphs C-C2, wherein the loading (602) further comprises advancing (606) the cargo (200) downwards and rearwards towards and/or into a cargo hold (28) of the aircraft (10).

C4. The method (600) of paragraph C3, wherein the advancing (606) the cargo (200) downwards and rearwards towards and/or into the cargo hold (28) comprises sliding the cargo (200) towards and/or into the cargo hold (28).

C5. The method (600) of any of paragraphs C3-C4, wherein the advancing (606) the cargo (200) downwards and rearwards towards and/or into the cargo hold (28) further comprises powering a conveyor system (170).

C6. The method (600) of any of paragraphs C-C5, further comprising unloading (640) the cargo (200) from the aircraft (10).

C7. The method (600) of paragraph C6, wherein the unloading (640) comprises unloading (642) the cargo (200) through the upper forward portion of the fuselage (22).

C8. The method (600) of paragraph C7 when depending from any of paragraphs C1-C5, wherein the unloading (640) comprises the opening (604) the first cargo door (30) to create the opening in the upper forward portion of the fuselage (22).

C9. The method (600) of paragraph C8, wherein, after the opening (604) the first cargo door (30), the unloading (640) further comprises unloading (642) the cargo (200) from the aircraft (10) through the opening in the upper forward portion of the fuselage (22).

C10. The method (600) of any of paragraphs C6-C9, wherein the unloading (640) further comprises pulling the cargo (200) upwards and forwards out of the cargo hold (28).

C11. The method (600) of paragraph C10, wherein the pulling comprises sliding the cargo (200) upwards and forwards out of the cargo hold (28).

C12. The method (600) of any of paragraphs C10-C11 when depending from paragraph C5, wherein the pulling further comprises powering the conveyor system (170).

C13. The method (600) of any of paragraphs C-C12, wherein the unloading (640) further comprises unloading (644) the cargo (200) through a bottom (26) of the fuselage (22).

C14. The method (600) of paragraph C13, wherein the unloading (644) the cargo (200) through the bottom (26) of the fuselage (22) comprises opening a cargo unloading door (50) positioned on the bottom (26) of the fuselage (22).

C15. The method (600) of paragraph C14, wherein the opening the cargo unloading door (50) comprises powering a motorized door opening mechanism (58).

C16. The method (600) of any of paragraphs C-C15, further comprising loading (620) a power source (146) into the fuselage (22).

C17. The method (600) of paragraph C16, wherein the loading (620) the power source (146) is performed after the loading (602) the cargo (200) on to the aircraft (10).

C18. The method (600) of any of paragraphs C16-C17, wherein the loading (620) the power source (146) further comprises coupling the power source (146) to one or more of the fuselage (22) and a ramp structure (40) positioned forward of the cargo hold (28).

D. A method (700) for loading and/or unloading cargo (200) onto and/or from an aircraft (10), the method (700) comprising:

receiving (702) cargo (200) through a first cargo door (30) positioned on a top (25) of a fuselage (22) of the aircraft (10); and unloading (712) the cargo (200) through a cargo unloading door (50) positioned on a bottom (26) of the fuselage (22) of the aircraft (10).

D1. The method (700) of paragraph D, further comprising landing (706) on a landing surface (210) prior to the receiving (702) the cargo (200).

D2. The method (700) of any of paragraphs D-D1, further comprising opening the first cargo door (30) prior to the receiving the cargo (200).

D3. The method (700) of any of paragraphs D-D2, wherein the unloading (712) comprises opening (714) the cargo unloading door (50).

D4. The method (700) of paragraph D3, further comprising maintaining (716) the cargo unloading door (50) open and lifting off from the landing surface (210) after unloading (708) the cargo (200).

E. A method of enhancing operational efficiency of an aircraft (10), comprising:

using pusher rotors (100) and puller rotors (120), wherein the puller rotors (120) are positioned rearward of the pusher rotors (100) relative to an airframe (20) of the aircraft (10).

E1. The method of paragraph E1, further comprising the method of any of paragraphs C-D4.

E2. The method of any of paragraphs E-E1, wherein the aircraft (10) is the aircraft (10) of any of paragraphs A-B43.

F. The use of the aircraft (10) of any of paragraphs A-B43.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An aircraft, comprising:
an airframe comprising one or more wings;
one or more pusher rotors supported by the airframe; and
one or more puller rotors supported by the airframe, wherein the one or more puller rotors are positioned rearward of the one or more pusher rotors;
wherein the one or more pusher rotors are configured to be selectively tilted relative to the one or more wings between a vertical-thrusting push position and a horizontal-thrusting push position; and
wherein the one or more puller rotors are configured to be selectively tilted relative to the one or more wings between a vertical-thrusting pull position and a horizontal-thrusting pull position.

2. The aircraft of claim 1, wherein at least one of the one or more pusher rotors is Configured to tilt in an opposite rotational direction to at least one of the one or more puller rotors.

3. The aircraft of claim 1, wherein when the one or more pusher rotors are in the horizontal-thrusting push position and when the one or more puller rotors are positioned in the horizontal-thrusting pull position, the one or more pusher rotors and the one or more puller rotors are vertically offset from one another.

4. The aircraft of claim 1, wherein the aircraft is an unmanned electric aircraft.

5. The aircraft of claim 1, wherein at least one of the one or more pusher rotors is configured to be tilted independently of at least one of the one or more puller rotors.

6. The aircraft of claim 1, wherein the one or more wings comprise a forward set of wings and an aft set of wings.

7. The aircraft of claim 6, wherein the one or more pusher rotors extend behind a trailing edge of the forward set of wings, and wherein the one or more puller rotors extend in front of a leading edge of the aft set of wings.

8. The aircraft of claim 6, further comprising longitudinal crossbars that extend lengthwise between the forward set of wings and the aft set of wings.

9. The aircraft of claim 6, further comprising landing gear, wherein the landing gear comprises rear landing gear that extends from the aft set of wings and front landing gear that extends from the forward set of wings.

10. The aircraft of claim 1, further comprising:
a fuselage comprising a cargo hold configured to store cargo, wherein the one or more wings are fixed relative to the fuselage;

a cargo door configured to selectively open to receive the cargo through an upper forward portion of the fuselage; and a ramp structure included within the fuselage, wherein the ramp structure is configured to provide a passageway for the cargo to advance between the cargo door and the cargo hold.

11. The aircraft of claim 10, wherein the cargo door is configured to receive and/or unload the cargo from a position vertically higher than the cargo hold.

12. The aircraft of claim 10, further comprising a conveyor system configured to advance the cargo rearwards towards the cargo hold.

13. The aircraft of claim 10, further comprising a power source that is configured to be selectively coupled to the ramp structure.

14. The aircraft of claim 10, wherein the ramp structure is fully included within the fuselage.

15. The aircraft of claim 14, wherein the ramp structure includes an inclined surface, and wherein the inclined surface slopes downwards from the cargo door to the cargo hold.

16. The aircraft of claim 10, further comprising a cargo unloading door configured to selectively open to unload the cargo through a bottom of the fuselage.

17. The aircraft of claim 16, further comprising a motorized door opening mechanism that is configured to selectively adjust the cargo unloading door between a cargo-unloading-door closed position and a cargo-unloading-door open position.

18. A method of enhancing operational efficiency of the aircraft of claim 1, comprising:
using the one or more pusher rotors and the one or more puller rotors to operate the aircraft.

19. The method of claim 18, further comprising:
loading cargo into a fuselage of the aircraft through an upper forward portion of the fuselage; and
advancing the cargo downwards and rearwards towards and into a cargo hold of the aircraft.

20. A method of operating the aircraft of claim 1, comprising:
operating the aircraft in a hover mode by tilting the one or more pusher rotors relative to the airframe to the vertical-thrusting push position and tilting the one or more puller rotors relative to the airframe to the vertical-thrusting pull position; and
operating the aircraft in a cruise mode by tilting the one or more pusher rotors relative to the airframe to the horizontal-thrusting push position and tiling the one or more puller rotors relative to the aircraft to the horizontal-thrusting pull position.

* * * * *